US012626066B2

(12) United States Patent
Zhao et al.

(10) Patent No.: US 12,626,066 B2
(45) Date of Patent: May 12, 2026

(54) EXTRACTING CONVERSATIONAL RELATIONSHIPS BASED ON SPEAKER PREDICTION AND TRIGGER WORD PREDICTION

(71) Applicant: TENCENT CLOUD COMPUTING (BEIJING) CO., LTD, Beijing (CN)

(72) Inventors: Tianyang Zhao, Beijing (CN); Zhao Yan, Beijing (CN)

(73) Assignee: TENCENT CLOUD COMPUTING (BEIJING) CO., LTD, Beijing (CN)

( * ) Notice: Subject to any disclaimer, the term of this patent is extended or adjusted under 35 U.S.C. 154(b) by 418 days.

(21) Appl. No.: 18/132,723

(22) Filed: Apr. 10, 2023

(65) Prior Publication Data

US 2023/0244878 A1 Aug. 3, 2023

Related U.S. Application Data

(63) Continuation of application No. PCT/CN2021/108503, filed on Jul. 26, 2021.

(30) Foreign Application Priority Data

Jun. 17, 2021 (CN) .......................... 202110674476.3

(51) Int. Cl.
*G06F 40/35* (2020.01)
*G06F 40/279* (2020.01)
(52) U.S. Cl.
CPC ............ *G06F 40/35* (2020.01); *G06F 40/279* (2020.01)
(58) Field of Classification Search
CPC ....... G06F 40/35; G06F 40/279; G06F 40/274
(Continued)

(56) References Cited

U.S. PATENT DOCUMENTS 11,810,548 B2 * 11/2023 Kim ...................... G06N 3/045
2020/0344194 A1 * 10/2020 Hosseinisianaki ..... G06N 3/084
(Continued)

FOREIGN PATENT DOCUMENTS

CN 112069811 A 12/2020
CN 112163416 A 1/2021
CN 113128180 A * 7/2021 ............. G06N 3/045

OTHER PUBLICATIONS

Dian Yu ("Dialogue-Based Relation Extraction") (Year: 2020).*
(Continued)

*Primary Examiner* — Pierre Louis Desir
*Assistant Examiner* — Fouzia Hye Solaiman
(74) *Attorney, Agent, or Firm* — ArentFox Schiff LLP

(57) ABSTRACT

A method for processing a dialog relationship includes performing semantic feature extraction on a sample dialog text and sample statement or speaker pairs by an initial relationship prediction model, and performing relationship prediction based on the sample text semantic information and an actual statement or speaker relationship to determine a first loss based on a relationship prediction result. The method further includes performing masked speaker prediction based on the sample text semantic information to determine a second loss based on a masked speaker prediction result. The masked speaker prediction result represents a prediction of speakers masked in the sample dialog text. The method further includes performing trigger word prediction based on the sample text semantic information to determine a third loss, and training the initial relationship prediction model based on the first loss, the second loss and the third loss to obtain a dialog relationship prediction model.

20 Claims, 7 Drawing Sheets

(58) Field of Classification Search
USPC ............................................................ 704/9
See application file for complete search history.

(56) References Cited

U.S. PATENT DOCUMENTS

| | | | | |
|---|---|---|---|---|
| 2021/0406295 | A1* | 12/2021 | Zhong | G06F 18/25 |
| 2021/0406993 | A1* | 12/2021 | Sethi | G06N 3/084 |
| 2022/0036141 | A1* | 2/2022 | Tian | G06V 20/00 |
| 2023/0036812 | A1* | 2/2023 | Sun | G06V 30/274 |
| 2023/0128432 | A1* | 4/2023 | Yeh | G06F 18/24133 |
| | | | | 382/181 |

OTHER PUBLICATIONS

Devlin et al., "BERT: Pre-training of Deep Bidirectional Transformers for Language Understanding," NAACL, 2019, pp. 4171-4186.
Fu et al., "GraphRel: Modeling Text as Relational Graphs for Joint Entity and Relation Extraction," Proceedings of the 57th Annual Meeting of the Association for Computational Linguistics (ACL), Jul. 28-Aug. 2, 2019, pp. 1409-1418.
International Search Report in PCT/CN2021/108503, mailed Oct. 20, 2021, 5 pages.
Jain et al., "SciREX: A Challenge Dataset for Document-Level Information Extraction," Proceedings of the 58th Annual Meeting of the Association for Computational Linguistics (ACL), Jul. 2020, pp. 7506-7516.
Luan et al., "A General Framework for Information Extraction using Dynamic Span Graphs," Proceedings of NAACL-HLT, Jun. 2-7, 2019, pp. 3036-3046.
Nan et al., "Reasoning with Latent Structure Refinement for Document-Level Relation Extraction," Proceedings of the 58th Annual Meeting of the Association for Computational Linguistics (ACL), Jul. 5-10, 2020, pp. 1546-1557.
Srivastava et al., "Highway Networks," arXiv, May 2015, 6 pages.
Wang et al., "Global-to-Local Neural Networks for Document-Level Relation Extraction," Proceedings of the 2020 Conference on Empirical Methods in Natural Language Processing (EMNLP), Nov. 16-20, 2020, pp. 3711-3721.
Wang et al., "Two are Better than One: Joint Entity and Relation Extraction with Table-Sequence Encoders," Proceedings of the 2020 Conference on Empirical Methods in Natural Language Processing (EMNLP), Nov. 16-20, 2020, pp. 1706-1721.
Wei et al., "A Novel Cascade Binary Tagging Framework for Relational Triple Extraction," Proceedings of the 58th Annual Meeting of the Association for Computational Linguistics (ACL), Jul. 2020, pp. 1476-1488.
Written Opinion in PCT/CN2021/108503, mailed Oct. 20, 2021, 4 pages.
Xue et al., "GDPNet: Refining Latent Multi-View Graph for Relation Extraction," The Thirty-Fifth AAAI Conference on Artificial Intelligence (AAAI-21), 2021, pp. 14194-14202.
Yao et al., "DocRED: A Large-Scale Document-Level Relation Extraction Dataset," Proceedings of the 57th Annual Meeting of the Association for Computational Linguistics (ACL), Jul. 28-Aug. 2, 2019, pp. 764-777.
Yu et al., "Dialogue-Based Relation Extraction," Proceedings of the 58th Annual Meeting of the Association for Computational Linguistics (ACL), Jul. 5-10, 2020, pp. 4927-4940.
Zhao et al., "Asking Effective and Diverse Questions: A Machine Reading Comprehension based Framework for Joint Entity-Relation Extraction," Proceedings of the Twenty-Ninth International Joint Conference on Artificial Intelligence (IJCAI), Jul. 2020, pp. 3948-3954.
Zhou et al., "Document-Level Relation Extraction with Adaptive Thresholding and Localized Context Pooling," The Thirty-Fifth AAAI Conference on Artificial Intelligence (AAAI-21), May 2021, pp. 14612-14620.

* cited by examiner

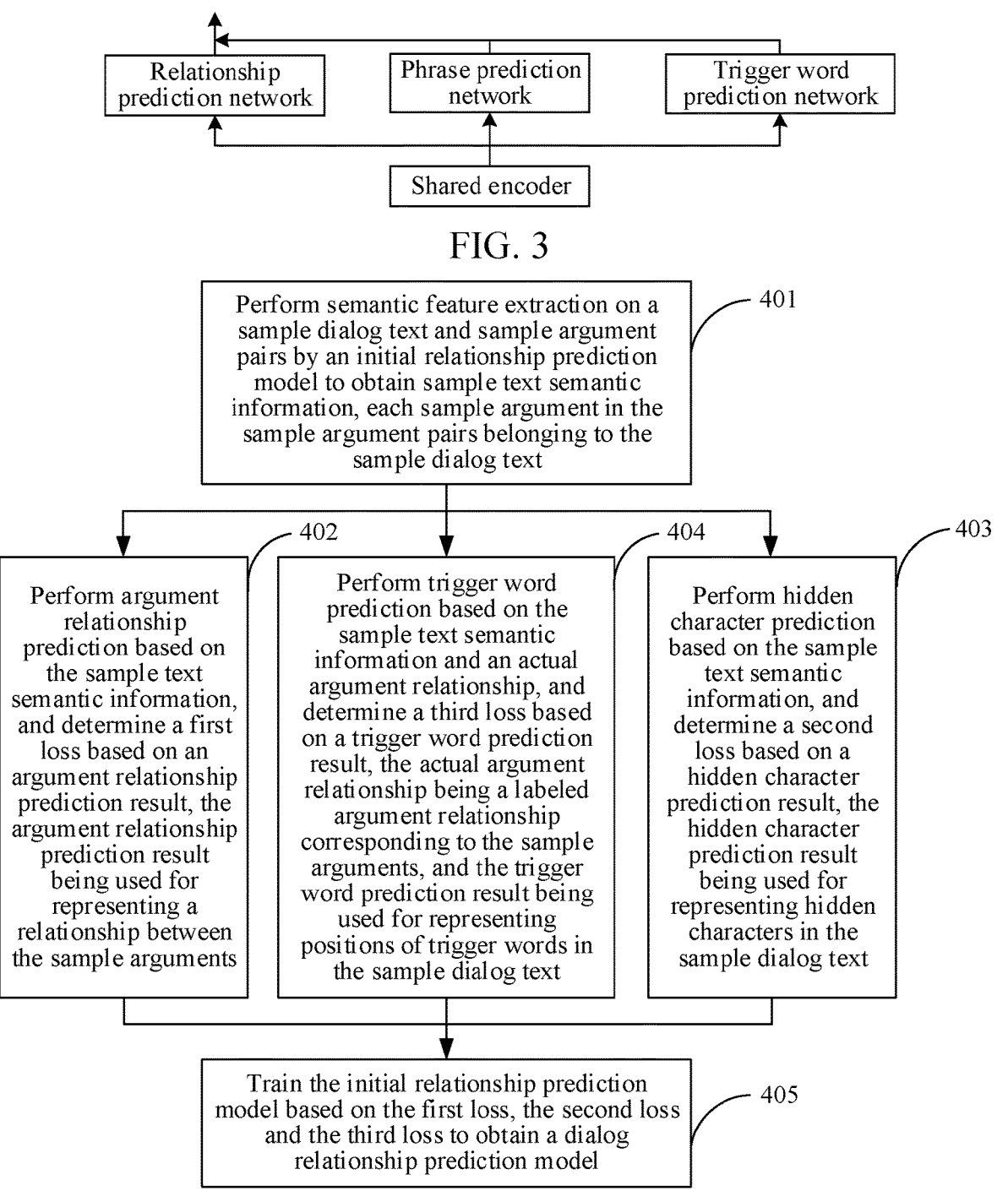

FIG. 3

Perform semantic feature extraction on a sample dialog text and sample argument pairs by an initial relationship prediction model to obtain sample text semantic information, each sample argument in the sample argument pairs belonging to the sample dialog text — 401

Perform argument relationship prediction based on the sample text semantic information, and determine a first loss based on an argument relationship prediction result, the argument relationship prediction result being used for representing a relationship between the sample arguments — 402

Perform trigger word prediction based on the sample text semantic information and an actual argument relationship, and determine a third loss based on a trigger word prediction result, the actual argument relationship being a labeled argument relationship corresponding to the sample arguments, and the trigger word prediction result being used for representing positions of trigger words in the sample dialog text — 404

Perform hidden character prediction based on the sample text semantic information, and determine a second loss based on a hidden character prediction result, the hidden character prediction result being used for representing hidden characters in the sample dialog text — 403

Train the initial relationship prediction model based on the first loss, the second loss and the third loss to obtain a dialog relationship prediction model — 405

Predictive argument relationship

7021

$h^{[CLS]}$    $h^{a1}$    $h^{a2}$

703

Sample text semantic information → $h_i^{mask}$ → Predictive character 7041    704

| O | O | ... | B | I | O |

$[e^r;\ h_1]$  $[e^r;\ h_2]$  ...  $[e^r;\ h_i]$  $[e^r;\ h_{i+1}]$  $[e^r;\ h_{i+2}]$ $h^{a_1}$              $h^{a_2}$

7013

$h^{[CLS]}$   $h_1^{a_1}$   $h_i$   $h_1^{a_2}$   $h_{i+n}$   ...   $h_j^{a_1}$   $h_j^{a_2}$

Hidden layer feature extraction

7012

[CLS]   $S_1$ :  Mom !   $S_2$ :  Sweetie   ...   [SEP]   $S_1$   [SEP]   $S_2$   [SEP]

701

Data preprocessing 701a        701b        7011

$a_1$ :  Mom !   $a_2$ :  Sweetie   ...        $a_1$   $a_2$

FIG. 7

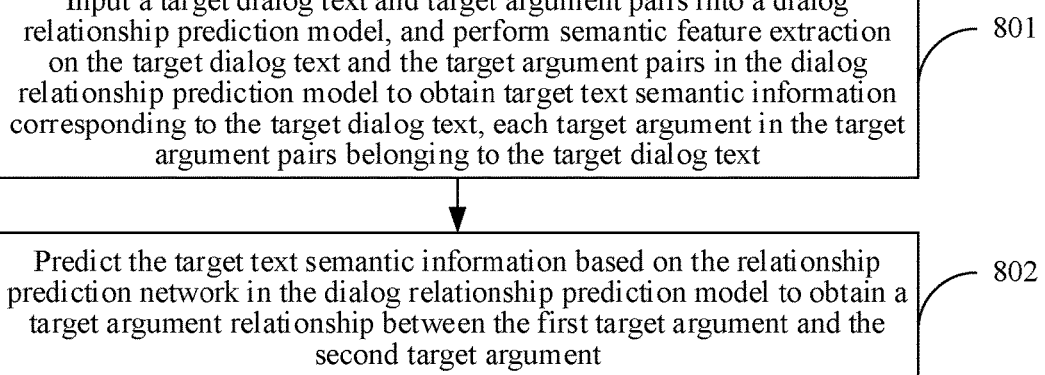

Input a target dialog text and target argument pairs into a dialog relationship prediction model, and perform semantic feature extraction on the target dialog text and the target argument pairs in the dialog relationship prediction model to obtain target text semantic information corresponding to the target dialog text, each target argument in the target argument pairs belonging to the target dialog text

801

Predict the target text semantic information based on the relationship prediction network in the dialog relationship prediction model to obtain a target argument relationship between the first target argument and the second target argument

EXTRACTING CONVERSATIONAL RELATIONSHIPS BASED ON SPEAKER PREDICTION AND TRIGGER WORD PREDICTION

RELATED APPLICATIONS

This application is a continuation of International Application No. PCT/CN2021/108503, entitled "DIALOGUE RELATIONSHIP PROCESSING METHOD, COMPUTER AND READABLE STORAGE MEDIUM" and filed on Jul. 26, 2021, which claims priority to Chinese Patent Application No. 202110674476.3, entitled "METHOD FOR PROCESSING DIALOG RELATIONSHIP, COMPUTER AND READABLE STORAGE MEDIUM" and filed on Jun. 17, 2021. The entire disclosures of the prior applications are hereby incorporated by reference.

FIELD OF THE TECHNOLOGY

This application relates to the technical field of computers, including a method for processing a dialog relationship, a computer and a readable storage medium.

BACKGROUND OF THE DISCLOSURE

At present, there is a need to process conversational data in many application scenarios. The analysis process of statements or speakers in conversational data is involved in the data processing process. For example, a task of relationship extraction between the statements or speakers is used for determining a relationship between any statements or speakers in conversational data.

In the task of relationship extraction, the semantic features of dialog text and statements or speakers pairs are generally extracted to obtain the relevant semantic feature representation, and then the relationship corresponding to the statements or speakers pairs is predicted based on the semantic feature representation.

In the above-mentioned relationship prediction process, as the semantic feature representation extraction of the dialog relationship is relatively complicated, it is difficult to accurately find the context information related to the statements or speakers, and thus, the prediction accuracy of the relationship is affected.

SUMMARY

Embodiments of this disclosure provide a method for processing a dialog relationship, a computer and a readable storage medium, which can improve the accuracy of relationship prediction in a dialog scene.

In an embodiment, a method for processing a dialog relationship includes performing semantic feature extraction on a sample dialog text and sample statement or speaker pairs by an initial relationship prediction model to obtain sample text semantic information. Each sample statement or speaker in the sample statement or speaker pairs is included in the sample dialog text. The method further includes performing relationship prediction based on the sample text semantic information and an actual statement or speaker relationship, and determining a first loss based on a relationship prediction result. The relationship prediction result represents a relationship between the sample statements or speakers, and the actual statement or speaker relationship is a labeled relationship corresponding to statements or speakers in the sample dialog text. The method further includes performing masked speaker prediction based on the sample text semantic information, and determining a second loss based on a masked speaker prediction result. The masked speaker prediction result represents a prediction of speakers masked in the sample dialog text. The method further includes performing trigger word prediction based on the sample text semantic information, and determining a third loss based on a trigger word prediction result. The trigger word prediction result represents positions of trigger words in the sample dialog text. The method further includes training the initial relationship prediction model based on the first loss, the second loss and the third loss to obtain a dialog relationship prediction model.

In an embodiment, an apparatus for processing a dialog relationship includes processing circuitry configured to perform semantic feature extraction on a sample dialog text and sample statement or speaker pairs by an initial relationship prediction model to obtain sample text semantic information. Each sample statement or speaker in the sample statement or speaker pairs being included in the sample dialog text. The processing circuitry is further configured to perform relationship prediction based on the sample text semantic information and an actual statement or speaker relationship, and determine a first loss based on a relationship prediction result. The relationship prediction result represents a relationship between the sample statements or speakers, and the actual statement or speaker relationship is a labeled relationship corresponding to statements or speakers in the sample dialog text. The processing circuitry is further configured to perform masked speaker prediction based on the sample text semantic information, and determine a second loss based on a masked speaker prediction result. The masked speaker prediction result represents a prediction of speakers masked in the sample dialog text. The processing circuitry is further configured to perform trigger word prediction based on the sample text semantic information, and determine a third loss based on a trigger word prediction result. The trigger word prediction result represents positions of trigger words in the sample dialog text. The processing circuitry is further configured to train the initial relationship prediction model based on the first loss, the second loss and the third loss to obtain a dialog relationship prediction model.

In the embodiment of this disclosure, an initial phrase prediction network and an initial trigger word prediction network are added to the initial relationship prediction model, hidden speakers in the sample dialog text are predicted by the initial phrase prediction network, and trigger words in the sample dialog text that can guide a relationship are predicted by the trigger word prediction network, so that an additional second loss and third loss are introduced. Auxiliary information which include speaker features and trigger word features are provided for the prediction of a relationships among statements or speakers, so that the initial relationship prediction model can learn more effective information that is more conducive to the prediction of relationships, and then the prediction accuracy of the relationship is improved.

BRIEF DESCRIPTION OF THE DRAWINGS

To describe the technical solutions of the embodiments of this disclosure or the related art more clearly, the following briefly introduces the accompanying drawings describing the embodiments or the related art. The accompanying drawings in the following description show only some embodiments of this disclosure, and a person of ordinary skill in the art may still derive other drawings from these accompanying drawings.

FIG. 3 is a schematic structural diagram of a model provided by an embodiment of this disclosure.

FIG. 4 is a flowchart of a method for processing a dialog relationship shown in an exemplary embodiment of this disclosure.

FIG. 7 is a schematic principle diagram of an initial relationship prediction model provided by an exemplary embodiment of this disclosure.

FIG. 8 is a flowchart of a method for processing a dialog relationship provided by an exemplary embodiment of this disclosure.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure shall fall within the protection scope of this disclosure.

Figure 1:
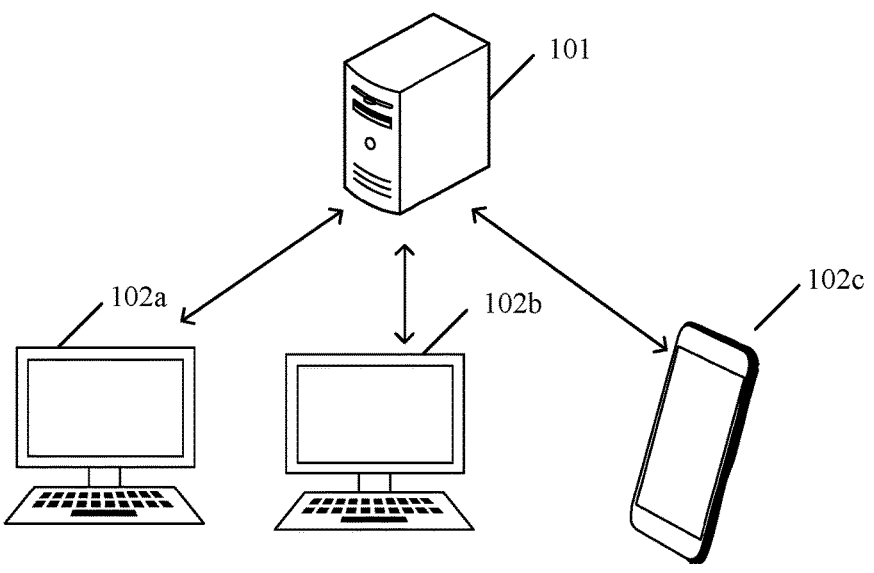
FIG. 1 is a network interaction architecture diagram of dialog relationship processing provided by an embodiment of this disclosure.

In the embodiment of this disclosure, referring to FIG. 1, FIG. 1 is a network interaction architecture diagram for dialog relationship processing provided by an embodiment of this disclosure. This embodiment of this disclosure may be realized by a computer device 101. The computer device 101 may perform data interaction with user equipment (such as user equipment 102*a*, user equipment 102*b*, user equipment 102*c*, etc.). If the computer device 101 is a device configured to perform model training, the computer device 101 can obtain a sample dialog text and sample argument pairs in the sample dialog text from each user equipment, realizes the model training based on the sample dialog text and the sample argument pairs, and obtains a dialog relationship prediction model used for predicting an argument pair relationship. The sample dialog text may be obtained from each user equipment, may also be obtained directly from the computer device 101 (that is, stored in the computer device 101), or may be obtained based on a cloud storage technology, and may also be obtained based on a blockchain network, which is not limited here. If the computer device 101 is a device configured to perform model prediction, that is, the computer device 101 runs a pretrained dialog relationship prediction model, the computer device 101 may respond to a relationship prediction request transmitted by any one of user equipment, for example, respond to a relationship prediction request transmitted by the user equipment 102*a*, obtains target dialog texts and target argument pairs included in the relationship prediction request, and predicts the target dialog texts and the target argument pairs based on the dialog relationship prediction model to obtain a target argument relationship of the target argument pairs. The computer device 101 may obtain the target dialog texts and the target argument pairs stored in the computer device 101, and predicts the target dialog texts and the target argument pairs based on the dialog relationship prediction model to obtain the target argument relationship of the target argument pairs. In other words, data involved in this disclosure may be provided by the user equipment, may also be stored in the computer device 101, or may be stored based on the cloud storage technology, or may be stored in the blockchain network, which is not limited here.

In order to improve the relationship prediction accuracy of the dialog relationship prediction model, according to the embodiment of this disclosure, a speaker prediction task and a trigger word prediction task are additionally added in a training task of the dialog relationship prediction model. The speaker prediction task is used for predicting covered speaker arguments in the sample dialog text, the trigger word prediction task is used for predicting words representing an argument relationship in the sample dialog text, and both tasks can assist a dialog relationship prediction task.

Figure 2:
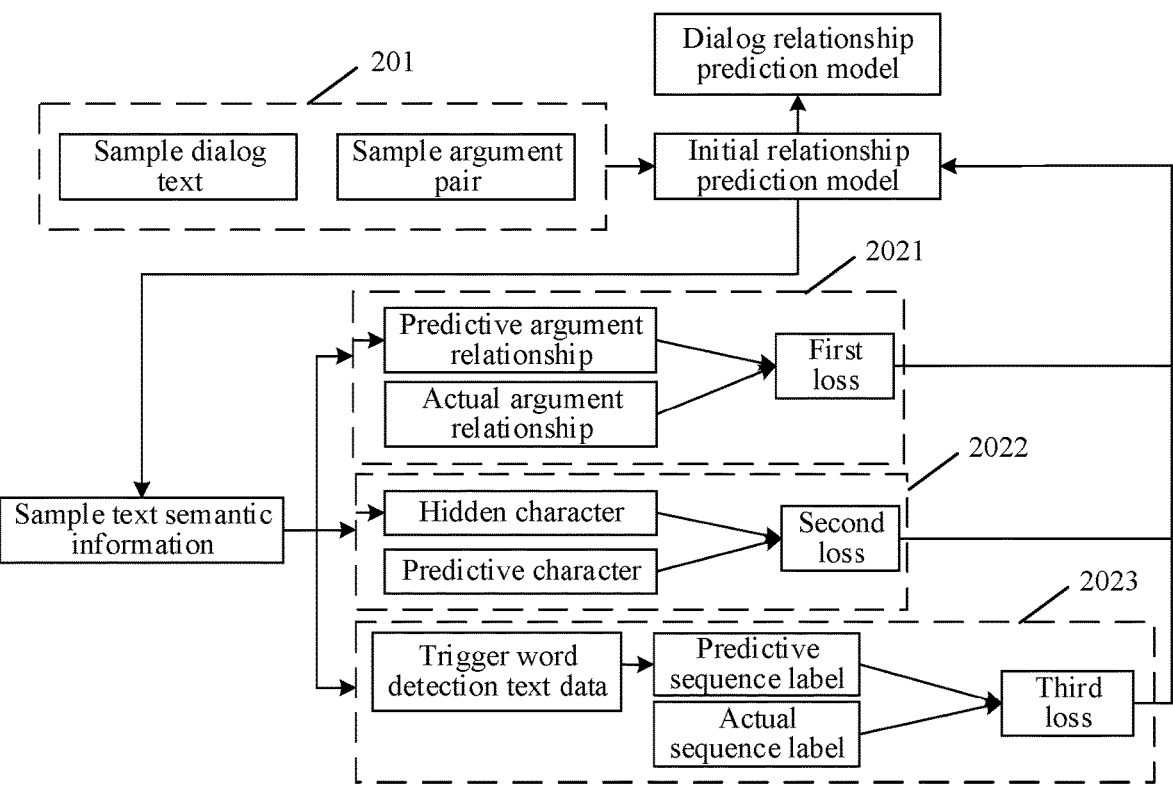
FIG. 2 is a schematic diagram of a scenario of model training provided by an embodiment of this disclosure.

Further, referring to FIG. 2, FIG. 2 is a schematic diagram of a scenario of model training provided by an embodiment of this disclosure. As shown in FIG. 2, a computer device can obtain a model training sample 201. The model training sample 201 includes a sample dialog text and sample argument pairs in the sample dialog text, and inputs the sample dialog text and the sample argument pairs into an initial relationship prediction model. Semantic feature extraction is performed on the sample dialog text and the sample argument pairs in the initial relationship prediction model to obtain sample text semantic information corresponding to the sample dialog text. The sample text semantic information is input into task processing areas in the initial relationship prediction model, which include a relationship prediction task area 2021, a phrase prediction task area 2022 and a trigger word prediction task area 2023. The sample argument pairs include a first sample argument and a second sample argument. The relationship prediction task area 2021 is used for performing relationship extraction on the sample argument pairs. The relationship extraction is a technique to identify and determine a specific relationship between entity pairs from natural language texts. Specifically, in the relationship prediction task area 2021, argument relationship predication is performed on the sample text semantic information to obtain a predictive argument relationship between the first sample argument and the second sample argument, an actual argument relationship between the first sample argument and the second sample argument is obtained, and a first loss is generated according to the predictive argument relationship and the actual argument relationship. In the phrase prediction task area 2022, a mask hidden state corresponding to hidden characters in the sample dialog text is obtained from the sample text semantic information, then predictive characters corresponding to the hidden characters are predicted based on the mask hidden state, and then a second loss is generated according to the hidden characters and the predictive characters. In the trigger word prediction task area 2023, trigger word detection text data is generated according to the actual argument relationship and the sample text semantic information, predictive sequence labels in the trigger word detection text data are predicted, and the predictive sequence labels are used for indicating a trigger word type to which each sample dialog phrase in the sample dialog text belongs. A third loss is generated according to actual sequence labels and the predictive sequence labels. According to the first loss, the second loss and the third loss, multi-task learning is performed on the initial relationship prediction model to generate a dialog relationship prediction model. By introducing effective information learned from the phrase prediction task, the trigger word prediction task and the like into the relationship prediction task, information in dialog texts (such as sample dialog texts or target dialog texts) can be obtained more comprehensively in the relationship prediction task, and thus, the prediction accuracy of the relationship prediction task is improved.

Further, referring to FIG. 3, FIG. 3 is a schematic structural diagram of a model provided by an embodiment of this disclosure. As shown in FIG. 3, the initial relationship prediction model includes an initial relationship prediction network, an initial phrase prediction network and an initial trigger word prediction network, etc. The initial relationship prediction model further includes an initial language representation network. The inputs of the initial relationship prediction network, the initial phrase prediction network and the initial trigger word prediction network, etc. are obtained based on the outputs of the initial language representation network. After the model parameter adjustment is performed on the initial relationship prediction model (that is, a model parameter of the initial relationship prediction model is adjusted), a dialog relationship prediction model is generated. The model parameter is a quantity that uses a general variable to establish a relationship between a number and a variable. In the field of artificial intelligence, the model parameter is usually a real matrix, and, with the development of the model, the model parameter may also be data in other formats. The dialog relationship prediction model may include a language representation network, a relationship prediction network, a phrase prediction network and a trigger word prediction network. The dialog relationship prediction model may only include language representation network, a relationship prediction network and the like, so as to simplify the model structure.

The phrase prediction network and the trigger word prediction network are used for performing feature information supplementation on the relationship prediction network, thus improving the prediction accuracy of the relationship prediction network. The relationship prediction task area refers to an area where the initial relationship prediction network and the relationship prediction network are located, that is, the network in the relationship prediction task area is called the initial relationship prediction network before training and the relationship prediction network after training, and is used for predicting an argument relationship between argument pairs (such as sample argument pairs or target argument pairs, etc.). The phrase prediction task area refers to an area where the initial phrase prediction network and the phrase prediction network are located, that is, the network in the phrase prediction task area is called the initial phrase prediction network before training and the phrase prediction network after training, and is used for predicting hidden phrases in the dialog texts. The trigger word prediction task area refers to an area where the initial trigger word prediction network and the trigger word prediction network are located. That is to say, the network in the trigger word prediction task area is called the initial trigger word prediction network before training and the trigger word prediction network after training, and is used for predicting whether each dialog phrase in dialog texts belongs to a trigger word.

It is to be understood that the computer device or user equipment mentioned in the embodiment of this disclosure includes but not limited to a terminal device or a server. In other words, the computer device or the user equipment can be a server or a terminal device, and may also be a system consisting of the server and the terminal device. The terminal device mentioned above may be an electronic device, including but not limited to a mobile phone, a tablet computer, a desktop computer, a notebook computer, a handheld computer, a vehicle-mounted device, an augmented reality/virtual reality, (AR/VR) device, a helmet-mounted display, a smart TV, a wearable device, a smart speaker, a digital camera, a video camera and other mobile Internet device (MID) with network access capability, or a terminal device in scenes such as trains, ships and flights. The server mentioned above may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, vehicle-road coordination, a content delivery network (CDN), big data, and an AI platform.

Referring to FIG. 4, FIG. 4 shows a flowchart of a method for processing a dialog relationship according to an exemplary embodiment of this disclosure. The embodiment of this disclosure is exemplarily illustrated by taking an application of the method to a computer device shown in FIG. 1 as an example. The method includes:

Step 401: Perform semantic feature extraction on a sample dialog text and sample argument pairs by an initial relationship prediction model to obtain sample text semantic information, each sample argument in the sample argument pairs belonging to the sample dialog text. In an embodiment, semantic feature extraction is performed on a sample dialog text and sample statement or speaker pairs by an initial relationship prediction model to obtain sample text semantic information, each sample statement or speaker in the sample statement or speaker pairs being included in the sample dialog text. As used herein "statement or speaker pairs" may include a a pair of two statements, a pair of two speakers, or one statement paired with one speaker. Likewise, a "statement or speaker relationship" as used herein may include a relationship between two statements, a relationship between two speakers, or a relationship between a speaker and a statement.

The initial relationship prediction model includes the initial language representation network, the initial relationship prediction network, the initial phrase prediction network and the initial trigger word prediction network. The initial language representation network is used for extracting the sample text semantic information (that is, text semantic feature representation). The initial relationship prediction network, the initial phrase prediction network and the initial trigger word prediction network share the sample text semantic information. The initial relationship prediction network predicts an argument relationship based on the sample text semantic information. The initial phrase prediction network predicts hidden characters in the sample dialog text based on based on the sample text semantic information. The initial trigger word prediction network predicts whether each sample phrase in the sample dialog text is a trigger word based on the sample text semantic information. In an embodiment, the initial relationship prediction model further includes a semantic enhancement network which is used for performing semantic enhancement on the extracted sample text semantic information.

Illustratively, the initial language representation network can use bidirectional encoder representations from transformers (BERT), an embedding from language model (ELMo) or a generative pre-training model (GPT/GPT2), etc.; and the embodiment of this disclosure does not limit the network type used for the initial language representation network.

Based on the function of each functional module in the above-mentioned initial relationship prediction model, in one possible implementation, the computer device inputs the sample dialog text and the sample argument pairs into the initial relationship prediction model. Semantic feature extraction is performed the sample dialog text and the sample argument pairs by the initial relationship prediction network in the initial relationship prediction model to obtain the sample text semantic information which is the semantic feature representation corresponding to the sample dialog text and the sample argument pairs, that is, the sample text semantic information is the form of feature vectors.

Before training the initial relationship prediction model, it is necessary to prepare a training sample set in advance. The training sample set in the embodiment of this disclosure is: the sample dialog text and the sample argument pairs. Each sample argument in the sample argument pairs belongs to the sample dialog text, that is, the model training goal is: how to make the initial relationship prediction model accurately predict the argument relationship between the sample arguments based on the sample dialog text.

The sample dialog text may be composed of a paragraph of dialog sentence generated in the process of m rounds of dialogs. For example, the sample dialog text can be expressed as: $d=s_1{:}t_1, s_2{:}t_2, \ldots s_m{:}t_m$; $s_1$ represents a first speaker; $t_1$ represents the corresponding speech content of the first speaker; $s_m$ represents the m-th speaker; $t_m$ represents the corresponding speech content of the m-th speaker; and $t_m$ may be composed of N sample dialog phrases (words).

Each sample argument in the sample argument pair belongs to the sample dialog text. Generally speaking, the sample argument pair includes the first sample argument and the second sample argument, that is, the first sample argument and the second sample argument belong to the sample dialog text, and then the initial relationship prediction model is used for predicting the argument relationship between the first sample argument and the second sample argument. The sample argument pair may also include more than two sample arguments, and then the initial relationship prediction model is used for predicting the argument relationship between any two sample arguments in the sample argument pair.

The argument types of various sample arguments in the sample argument pair may all be speaker arguments. For example, if the sample dialog text is $d=s_1{:}t_1, s_2{:}t_2, \ldots, s_m{:}t_m$, the sample argument pair may include $s_1$ and $s_3$, and the sample argument pair may also include stand $s_2$. Or, the argument types of various sample arguments in the sample argument pair can include both the speaker argument and the phrase argument. The phrase argument is any argument except the speaker argument in the sample dialog text. For example, the sample argument pair may be $s_1$ and $N_1$, and $N_1$ may represent any word included in the speech content (t). Or, the argument types of various sample arguments in the sample argument pair are all phrase arguments, that is, the sample argument pair does not include the speaker argument. For example, the sample argument pair may be $N_1$ and $N_2$ which may represent any two different words contained in the speaker content (t).

Based on the relationship between the sample argument pair and the sample dialog text, in one possible implementation, the sample dialog text and the sample argument pair are manually input into a computer device for subsequent training of the initial relationship prediction model. The sample argument pair may be manually labeled in the sample dialog text, the sample dialog text labeled with the sample argument pair (labeled text) may be input into the computer device, and the computer device can determine the sample dialog text and the sample argument pair from the labeled text. In an embodiment, the computer device is internally provided with a sample argument pair determination mode, the sample dialog text is input into the computer device, and the computer device extracts the sample argument pair from the sample dialog text based on the input sample dialog text and the sample argument pair determination mode.

The way to determine the sample argument pair can indicate the argument type of each sample argument. For example, if the sample argument with the argument type being the speaker argument is extracted from the sample dialog text, any two speaker arguments are correspondingly determined as the sample argument pair.

Step 402: Perform argument relationship prediction based on the sample text semantic information the sample text, and determine a first loss based on an argument relationship prediction result, the argument relationship prediction result being used for representing a relationship between the sample arguments. For example, relationship prediction is performed based on the sample text semantic information and an actual statement or speaker relationship, and a first loss is determined based on a relationship prediction result. The relationship prediction result represents a relationship between the sample statements or speaker, and the actual statement or speaker relationship being a labeled relationship corresponding to statements or speakers in the sample dialog text.

The sample text semantic information obtained in step 401 are shared by three tasks. In one possible implementation, the sample text semantic information is input into the initial relationship prediction network. The initial relationship prediction network learns the global semantics of the sample dialog text and the context-related semantics of each argument from the sample text semantic information, then predicts the relationship between the sample arguments based on the global semantics and the context-related semantics, and further determines a first loss based on an argument relationship prediction result.

If the sample argument pair includes the first sample argument and the second sample argument, the argument relationship prediction result is a predictive argument relationship between the first sample argument and the second sample argument, the first loss is determined by the predictive argument relationship and the actual argument relationship, and the actual argument relationship is the real argument relationship between the first sample argument and the second sample argument.

In an embodiment, the initial relationship prediction network is a multi-classifier. The argument relationship prediction result output by the initial relationship prediction network is: the argument relationship corresponding to the sample argument pair is the probability of each candidate argument relationship, and the candidate argument relationship with the maximum probability is selected and determined as the predictive argument relationship corresponding to the sample argument pair.

For example, if the sample argument pair is two speaker arguments, the argument relationship prediction result is the relationship between the two speaker arguments. The outputs of the initial relationship prediction network may be: $P_1=0.05$ (indicating that the probability that the argument relationship is a mother-daughter relationship is 0.05), $P_2=0.01$ (indicating that the probability that the argument relationship is a mother-son relationship is 0.01), $P_3=0.8$ (indicating that the probability that the argument relationship is a brother-sister relationship is 0.8), $P_4=0.05$ (indicating that the probability that the argument relationship is a father-daughter relationship is 0.05), $P_5=0.04$ (indicating that the probability that the argument relationship is a father-son relationship is 0.05), the size relationship of each probability is compared, the brother-sister relationship is determined as the predictive argument relationship corresponding to the sample argument pair.

Step 403: Perform hidden character prediction based on the sample text semantic information, and determine a second loss based on a hidden character prediction result, the hidden character prediction result being used for representing hidden characters in the sample dialog text. For example, masked speaker prediction is performed based on the sample text semantic information, and a second loss is determined based on a masked speaker prediction result. The masked speaker prediction result representing a prediction of speakers masked in the sample dialog text.

In the scenario of dialog relationship prediction, considering that the extraction of the argument relationship between the speaker arguments is highly related to a speaker, for example, the relationship between the speaker arguments is closely related to the features of the speaker (expression habits, speaking tone, etc.), therefore, in order to further assist an argument relationship prediction task and make the initial relationship prediction model better learn features related to the speaker, in one possible implementation, the initial phrase prediction network (also called an initial speaker prediction network) is deployed to predict hidden characters in the sample dialog text, that is, to predict hidden speaker arguments in the sample dialog text.

In order to predict the hidden characters in the sample dialog text, it is necessary to have covered or hidden speaker arguments in the sample dialog text. Correspondingly, before the computer device inputs the sample dialog text into the initial relationship prediction model, it is necessary to cover speaker words corresponding to the speaker arguments in an original dialog text to obtain the sample dialog text, and then the subsequent semantic feature extraction process is performed.

In one possible implementation, the sample dialog text includes the hidden characters. In the process of performing semantic feature extraction based on the sample dialog text and the sample argument pairs, corresponding semantic feature representations can be obtained for both the hidden characters and non-hidden characters, that is, the sample text semantic information includes the semantic feature representations corresponding to the hidden characters, then the semantic feature representations are input into the initial phrase prediction network for hidden character prediction to obtain a hidden character prediction result output by the initial phrase prediction network, and then a second loss is determined based on actual hidden characters and the hidden character prediction result In an embodiment, as the initial phrase prediction network is mainly used for predicting the hidden speaker words (words corresponding to the speaker arguments) in the sample dialog text, the task principle is as follows: if the initial phrase prediction network may distinguish which speaker is speaking, it indicates that the initial phrase prediction network may identify speaker features based on the sample text semantic information, further indicating that the sample text semantic information is more accurate, thus helping to predict a speaker-related argument relationship, that is, the initial phrase prediction network can provide an auxiliary function for predicting the argument relationship between the speakers; in other words, if the initial relationship prediction model does not need to predict the argument relationship between the speaker arguments, there is no need to deploy the initial phrase prediction network; and if the initial relationship prediction model needs to predict the argument relationship between the speaker arguments, there is need to deploy the initial phrase prediction network.

Step 404: Perform trigger word prediction based on the sample text semantic information and an actual argument relationship, and determine a third loss based on the trigger word prediction result, the actual argument relationship being a labeled argument relationship corresponding to sample arguments, and the trigger word prediction result being used for representing the positions of the trigger words in the sample dialog text. For example, trigger word prediction is performed based on the sample text semantic information, and a third loss is determined based on a trigger word prediction result. The trigger word prediction result represents positions of trigger words in the sample dialog text.

In the scenario of dialog relationship prediction, there are often words in the dialog text that may indicate the argument relationship, which are called trigger words. For the complex and lengthy dialog text, trigger word information may also play a certain guiding role for the extraction of a final argument relationship. Therefore, in one possible implementation, the initial trigger word prediction network is deployed in the initial relationship prediction model to predict the positions of the trigger words in the sample dialog text, that is, the initial trigger word prediction network needs to identify whether each sample dialog phrase in the sample dialog text is a trigger word.

Schematically, if the sample dialog text is a dialog between a mother and a daughter, the trigger words may be dialog phrases such as "mother" and "daughter" appearing in the sample dialog text.

If it is necessary to identify whether a sample dialog phrase is a trigger word, that is, to determine whether the sample dialog phrase has some connection with the argument relationship or whether the sample dialog phrase may indicate the argument relationship, therefore, in the model training process, if it is necessary to guide the initial trigger word prediction network to learn trigger word features correctly, the real argument relationship needs to participate in the training. In one possible implementation, the computer device obtains the actual argument relationship corresponding to the sample argument pair, and inputs the actual argument relationship and the sample text semantic information jointly into the initial trigger word prediction network, so that the initial trigger word prediction network may predict whether each sample dialog phrase is the trigger word based on the sample text semantic information and the actual argument relationship, thereby obtaining the trigger word prediction result that can represent the position of the trigger word in the sample dialog text, and further determining a third loss based on the trigger word prediction result and actual trigger word information.

Step 405: Train the initial relationship prediction model based on the first loss, the second loss and the third loss to obtain a dialog relationship prediction model.

In one possible implementation, the proposed relationship extraction task, speaker prediction task and trigger word prediction task are jointly trained in a multi-task joint learning way, that is, a joint loss is established according to the first loss (argument relationship prediction loss), the second loss (speaker prediction loss) and the third loss (trigger word prediction loss), then the initial relationship prediction model is trained based on the joint loss, and a dialog relationship prediction model is obtained after repeated training for many rounds until the loss converges.

The speaker prediction task may provide assistance for the relationship prediction task from the perspective of speaker features, and the trigger word prediction task may provide guidance for the relationship prediction task from the perspective of trigger word features. In other possible implementations, at least one of the speaker prediction task and the trigger word prediction task can be used for providing guidance for the relationship prediction task, that is, the initial relationship prediction model may include an initial language representation network, an initial relationship prediction network, an initial phrase prediction network and an initial trigger word prediction network, and correspondingly, in the model training process, the initial relationship prediction model is jointly trained based on the first loss (generated by the initial relationship prediction network), the second loss (generated by the initial phrase prediction network), and the third loss (generated by the initial trigger word prediction network). The initial relationship prediction model may also include the initial language representation network, the initial relationship prediction network and the initial phrase prediction network, and correspondingly, in the model training process, the initial relationship prediction model is jointly trained based on the first loss and the second loss. The initial relationship prediction model may also include the initial language representation network, the initial relationship prediction network and the initial trigger word prediction network, and correspondingly, in the model training process, the initial relationship prediction model is jointly trained based on the first loss and the third loss.

The initial trigger word prediction network and the initial phrase prediction network are added in the model training stage to assist the training, but in the model application stage, only the relationship prediction task and the semantic feature extraction task can be reserved without the above two subtasks, that is, the dialog relationship prediction model may only include the language representation network and the relationship prediction network.

In summary, in the embodiment of this disclosure, the initial phrase prediction network and the initial trigger word prediction network are added to the initial relationship prediction model, hidden speaker arguments in the sample dialog text are predicted by the initial phrase prediction network, and the trigger words in the sample dialog text that can guide the argument relationship are predicted by the trigger word prediction network, so that the additional second loss and third loss are introduced to the loss; auxiliary information which include speaker features and trigger word features are provided for the prediction of the argument relationship, so that the initial relationship prediction model can learn effective information that is more conducive to the prediction of the argument relationship, and then the prediction accuracy of the argument relationship is improved.

Figure 5:
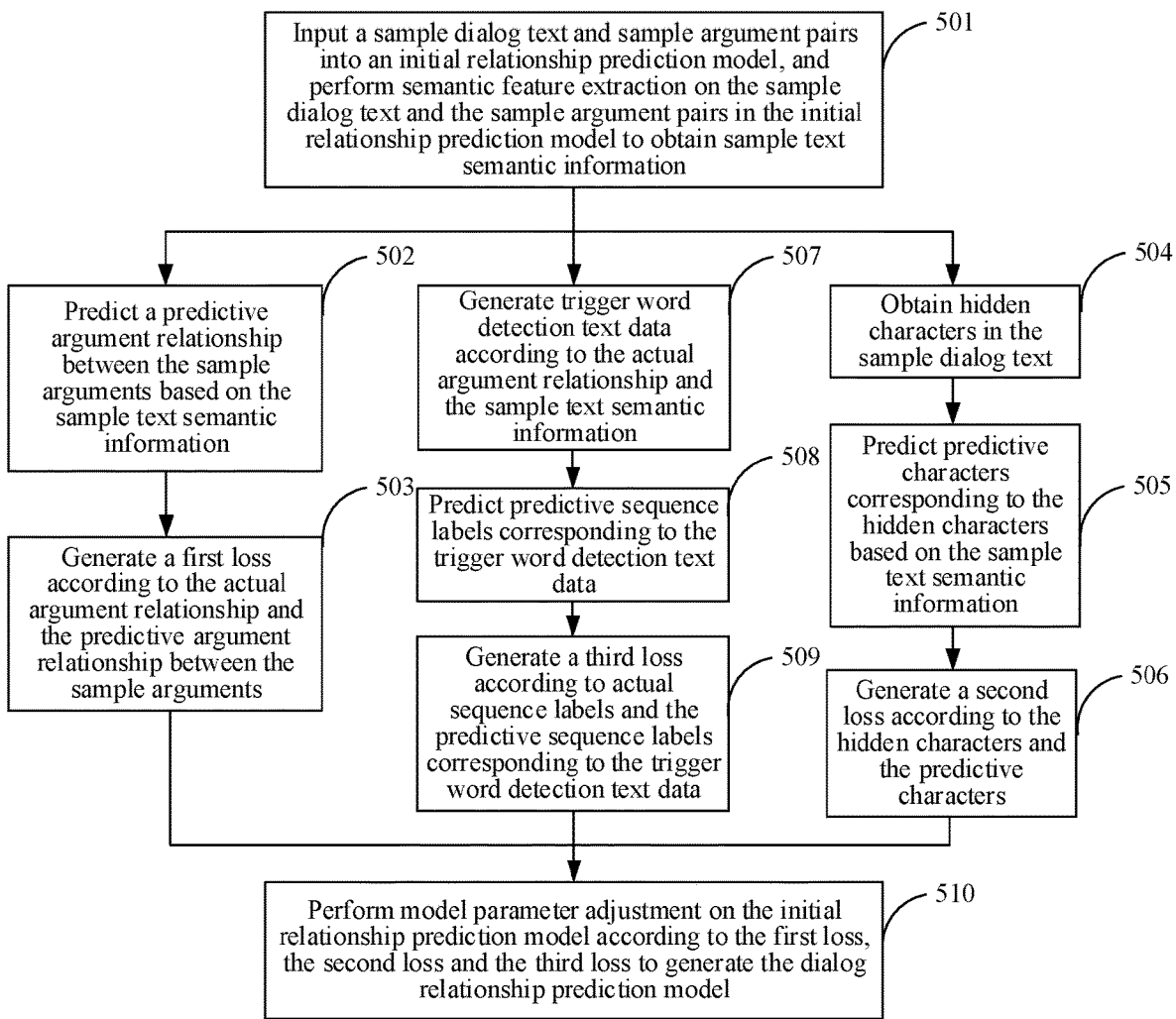
FIG. 5 is a flowchart of a method for processing a dialog relationship provided by another exemplary embodiment of this disclosure.

Referring to FIG. 5, FIG. 5 is a flowchart of a method for processing a dialog relationship provided by another exemplary embodiment of this disclosure. As shown in FIG. 5, the method for processing a dialog relationship includes the following steps:

Step 501: Input a sample dialog text and sample argument pairs into the initial relationship prediction model, and perform semantic feature extraction on the sample dialog text and the sample argument pairs in the initial relationship prediction model to obtain the sample text semantic information.

The sample argument pair include a first sample argument and a second sample argument.

In the embodiment of this disclosure, the computer device obtains a training sample which includes the sample dialog text and the sample argument pair in the sample dialog text. An argument refers to a substantive component with a theta-role. A noun collocated with a predicate can be called an argument. The sample dialog text may be any text data including at least two arguments. The sample argument pair may be any two arguments in the sample dialog text, for example, an argument pair composed of any two speakers in the sample dialog text, or an argument pair composed of any two items in the sample dialog text, or an argument pair composed of a speaker and an item in the sample dialog text, which is not limited here. For example, the obtained sample dialog text is "Speaker 1: 'Uh, like, could these margaritas be any stronger? Hey, Chandler.', Speaker 2: 'Hello, Mr.B-ing', Speaker 3: ' . . . ', . . . ", then the sample argument pair may be an argument pair composed of any two speakers in the sample dialog text, such as "{Speaker 1, Speaker 2}, {Speaker 1, Speaker 3} and {Speaker 2, Speaker 3}, etc.", or an argument pair composed of a speaker and an item, such as "Speaker 1, margaritas}, {Speaker 2, margaritas}, etc.", which is not limited here. That is to say, the sample argument pair may have different argument types, including but not limited to a same speaker argument type, a same object argument type, a speaker and object argument type and the like. In the process of model training, the initial relationship prediction model may be trained based on different argument types at the same time to obtain dialog relationship prediction models that may detect different argument types, so as to improve the generalization of the dialog relationship prediction models obtained by training; or, the initial relationship prediction model may be trained separately based on different argument types to obtain multiple dialog relationship prediction models, and different dialog relationship prediction models detect different argument types, so as to improve the accuracy of the dialog relationship prediction models obtained by training. The number of argument types that a model needs to detect may be determined based on the need and considering the generalization and accuracy of the model comprehensively, which is not limited here. Further, the computer device can input the obtained sample dialog text and the sample argument pair in the sample dialog text into the initial relationship prediction model, and performs semantic feature extraction on the sample dialog text and the sample argument pair in the initial relationship prediction model to obtain the sample text semantic information corresponding to the sample dialog text.

Figure 6:
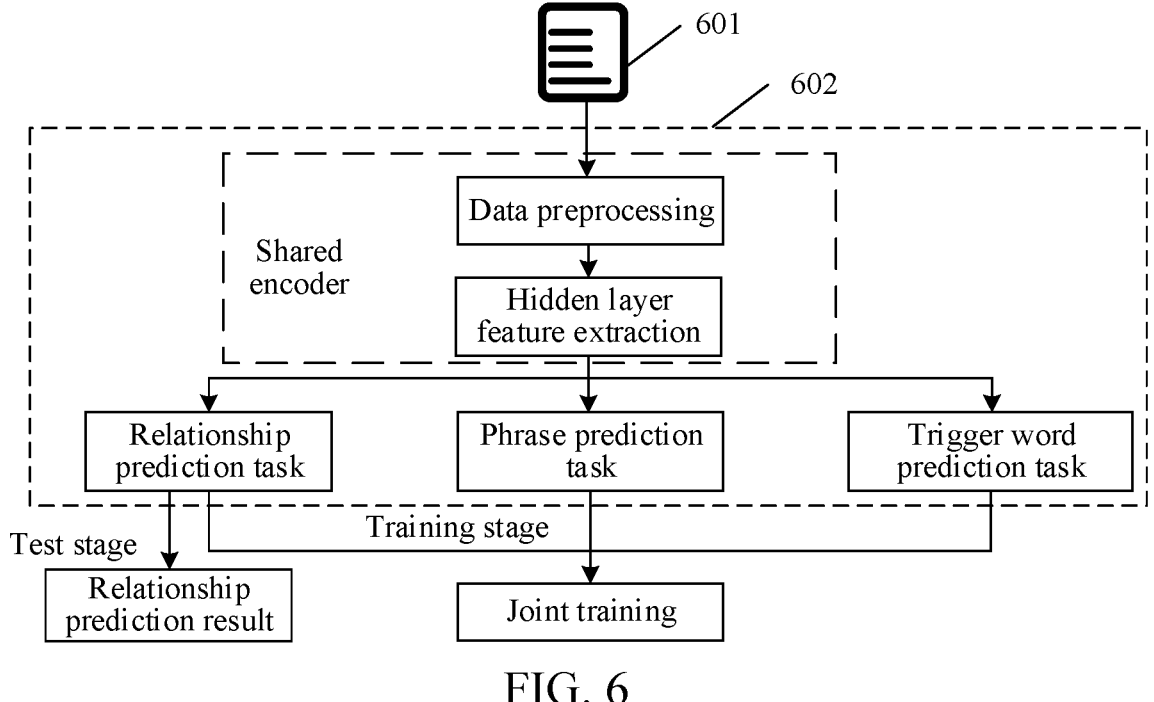
FIG. 6 is an architecture diagram of an initial relationship prediction model provided by an exemplary embodiment of this disclosure.

The computer device may perform data preprocessing and hidden feature extraction on the sample dialog text and the sample argument pair in the initial relationship prediction model to obtain the sample text semantic information corresponding to the sample dialog text. FIG. 6 is an architecture diagram of an initial relationship prediction model provided by an exemplary embodiment of this disclosure. As shown in FIG. 6, the computer device may obtain a model training sample 601. The model training sample 601 may include the sample dialog text and the sample argument pair in the sample dialog text, and inputs the sample dialog text and the sample argument pair into the initial relationship prediction model 602. Data preprocessing and hidden layer feature extraction are performed on the sample dialog text and the sample argument pair based on a shared encoder in the initial relationship prediction model 602 to obtain the sample text semantic information corresponding to the sample dialog text. The shared encoder is the initial language representation network shown in the above embodiment. The initial relationship prediction model 602 may perform the relationship prediction task, the phrase prediction task and the trigger word prediction task. In an embodiment, in the training stage, joint training is performed based on the relationship prediction task, the phrase prediction task and the trigger word prediction task. In the test stage and application stage, only the shared encoder and the relationship prediction task may be used for obtaining the relationship prediction result.

In this embodiment, before semantic feature extraction is performed based on the sample dialog text and the sample argument pair, it is necessary to perform data preprocessing on the sample dialog text and the sample argument pair to facilitate the subsequent semantic feature extraction process. The data preprocessing process may roughly include two steps: a sample data splicing process and a sample symbol replacement process.

The initial relationship prediction model may also include a data preprocessing module which is configured to perform data preprocessing on the sample dialog text and the sample argument pair.

In an illustrative example, step 501 may further include step 501A to step 501C.

Step 501A: Splice the sample dialog text and the sample argument pairs based on sample text splicing symbols in the initial relationship prediction model to generate sample splicing text data.

As it is necessary to input the sample dialog text and the sample argument pair into the initial relationship prediction model together, correspondingly, it is necessary to splice the sample dialog text and the sample argument pair into a set of text data. In one possible implementation, after the computer device obtains the sample dialog text and the sample argument pair, the sample dialog text and the sample argument pair are spliced based on the sample text splicing symbols.

The sample text splicing symbols may include a sample global semantic symbol and a sample separator. The sample global semantic symbol is used for referring to complete sample text data (including the sample dialog text and the sample argument pair) input into the initial relationship prediction model, and the sample separator is used for separating the sample dialog text and the sample argument pair. Schematically, the sample global semantic symbol can be expressed as [CLS], and the sample separator can be expressed as [SEP]. In an embodiment, the sample global semantic symbol and the sample separator are not limited to the above symbols, other special symbols may also be adopted, which are not limited by the embodiment of this disclosure.

In an exemplary example, if the sample dialog text is expressed as: $d=S_1:t_1, s_2:t_2, s_3:t_3 \ldots, s_m:t_m$, the sample argument pair includes a first sample argument $a_1$ and a second sample argument $a_2$, the sample global semantic symbol is [CLS], and the sample separator is [SEP]; and correspondingly, after the sample dialog text and the sample argument pair are spliced, generated sample splicing text data may be expressed as: [CLS]$s_1:t_1$, $s_2:t_2$, $s_3:t_3 \ldots$, $s_m:t_m$[SEP] $a_1$ [SEP] $a_2$ [SEP].

Specifically, the computer device may splice the sample dialog text and the sample argument pair based on the sample text splicing symbols in the initial relationship prediction model to generate the sample splicing text data. The sample text splicing symbols may include the sample global semantic symbol and the sample separator, etc. Specifically, the computer device may splice the sample dialog text and the sample argument pair, the sample text splicing symbols are inserted into splicing samples obtained by splicing to obtain the sample splicing text data. The sample text splicing symbols and the insertion mode of the sample text splicing symbols may be determined based on the initial language representation network in the initial relationship prediction model, that is, different initial language representation networks have different sample splicing specifications, for example, if the initial language representation network adopts BERT, the corresponding sample splicing symbols include [CLS] and [SEP], and the insertion mode of the splicing symbols is as shown in the above embodiment. The sample text splicing symbol may be any special character or special character string, which is not limited here. The sample global semantic symbol is used for referring to the global representation of the sample dialog text and the sample argument pair, and the sample separator is used for separating the sample dialog text and the sample argument pair. For example, the sample dialog text is taken as Tx, it is assumed that the sample global semantic symbol in the sample text splicing symbols is [CLS] and the sample separator in the sample text splicing symbols is [SEP], the sample dialog text and the sample argument pair are spliced based on the sample global semantic symbol and the sample separator. The first sample argument is denoted as $a_1$, and the second sample argument is denoted as $a_2$. After the sample dialog text and the sample argument pair are spliced, sample splicing text data is obtained and may be "[CLS] Tx[SEP] $a_1$[SEP] $a_2$[SEP]". It is assumed that the sample dialog text Tx is "$s_1:t_1s_2:t_2 \ldots s_u:t_u$", and at this time, the sample splicing text data can be expressed as "[CLS] $s_1:t_1s_2:t_2 \ldots s_u:t_u$ [SEP] $a_1$[SEP] $a_2$[SEP]". The sample separator may be further inserted into the sample dialog text based on the text composition structure of the sample dialog text to obtain sample splicing text data, such as "[CLS] $s_1$: $t_1$[SEP]$s_2:t_2$ [SEP] $\ldots$ [SEP]$s_u:t_u$ [SEP] $a_1$[SEP] $a_2$[SEP]", which is not limited here.

Step 501B: Replace the first sample argument in the sample splicing text data with the first sample argument symbol, and replace the second sample argument in the sample splicing text data with the second sample argument symbol, to generate sample text sequence data.

As the training task of the initial relationship prediction model is to predict the argument relationship between the first sample argument and the second sample argument, in order to highlight the first sample argument and the second sample argument in the input sample splicing text data and make the initial relationship prediction model (mainly the initial language representation network in the initial relationship prediction model) pay more attention to the sample arguments in the sample splicing text data, in one possible implementation, special symbols are used for replacing the sample arguments in the sample splicing text data. The special symbols can not only indicate the positions of the sample arguments in the sample dialog text, but also make the initial language representation network better extract the context semantic information related to the sample arguments; and at the same time, the special symbols are also related to the argument types of the sample arguments themselves, so that the initial language representation network may extract features related to the sample argument types, and further improves the information richness in the semantic feature extraction process.

In an embodiment, the special symbols are specially used for representing speaker arguments, in other words, when the sample argument pair includes the sample arguments of the speaker type, the sample arguments in the sample splicing text data are replaced. In one possible implementation, if both the first sample argument and the second sample argument in the sample argument are speaker-type arguments, the first sample argument in the sample splicing text data is replaced with the first sample argument symbol, and the second sample argument in the sample splicing text data is replaced with the second sample argument symbol, and thus, the sample text sequence data is generated. As the sample splicing text data includes a sample dialog text part and a sample argument pair part, during replacement, it is necessary to replace the first sample argument and the second sample argument included in the sample dialog text part and the first sample argument and the second sample argument of the sample argument pair part.

In an exemplary example, the sample splicing text data is [CLS]$s_1$:$t_1$, $s_2$:$t_2$, $s_3$:$t_3$ . . . , $s_m$:$t_m$[SEP] $a_1$ [SEP] $a_2$ [SEP], both $a_1$ and $a_2$ are the sample arguments of speaker type, $a_1$ represents $s_1$, and $a_2$ represents $s_2$, which are used for predicting a relationship between speaker 1 and speaker 2 in the sample dialog text. The first sample argument symbol is $S_1$, and the second sample argument symbol is $S_2$. The sample splicing text data is replaced based on the first sample argument symbol and the second sample argument symbol, and the obtained sample text sequence data may be [CLS]$S_1$:$t_1$, $S_2$:$t_2$, $s_3$:$t_3$ . . . , $s_m$:$t_m$[SEP] $S_1$ [SEP] $S_2$ [SEP].

In an embodiment, in order to further highlight the position of the sample argument pair in the sample splicing text data, a starting argument symbol and an ending argument symbol may also be used for labeling the position of each sample argument in the sample splicing text data. The starting argument symbol may be represented by [B], and the ending argument symbol may be represented by [E]. The starting argument symbol and the ending argument symbol may be represented by other forms of symbols, which are not limited by the embodiment of this disclosure.

In an exemplary example, the sample splicing text data is [CLS]$s_1$:$t_1$, $s_2$:$t_2$, $s_3$:$t_3$ . . . , $s_m$:$t_m$[SEP] $a_1$ [SEP] $a_2$ [SEP]. After argument symbol replacement and addition of the starting argument symbol and the ending argument symbol are performed on the sample splicing text data, the obtained sample text sequence data may be [CLS] [B]$S_1$[E]:$t_1$, [B]$S_2$ [E]:$t_2$, $s_3$:$t_3$ . . . , $s_m$:$t_m$[SEP] $S_1$ [SEP] $S_2$ [SEP].

Further, the computer device may replace the first sample argument in the sample splicing text data with the first sample argument symbol, and replace the second sample argument in the sample splicing text data with the second sample argument symbol, to generate the sample text sequence data. In a case that the sample arguments are replaced with the corresponding sample argument symbols (that is, the first sample argument is replaced with the first sample argument symbol or the second sample argument is replaced with the second sample argument symbol), the positions of the sample arguments in the sample splicing text data may be labeled based on the starting argument symbol and the ending argument symbol. Specifically, the generation process of the sample text sequence data may be shown in Formula (1):

$$\hat{S}_i = \begin{cases} [B][S_1][E] & \text{if } s_i = a_1 \\ [B][S_2][E] & \text{if } s_i = a_2 \\ s_i & \text{otherwise} \end{cases} \quad (1)$$

As shown in formula (1), $\hat{S}_i$ represents the i-th character in the sample text sequence data, [B] represents the starting argument symbol, [E] represents the ending argument symbol, $a_1$ represents the first sample argument, $a_2$ represents the second sample argument, $s_i$ represents the i-th character in the sample splicing text data, [S1] represents the first sample argument symbol, and [S2] represents the second sample argument symbol. In an embodiment, the first sample argument symbol, the second sample argument symbol, the starting argument symbol and the ending argument symbol summarized in this disclosure are not limited to the above-mentioned representations, and may also be represented by other special characters or special character strings, which are not limited here. The formula (1) is used for indicating that the computer device traverses the sample splicing text data. If the i-th character in the sample splicing text data is the first sample argument (that is, $s_i$=$a_1$), the i-th character in the sample splicing text data is replaced with the first sample argument symbol [S1]. The position of the first sample argument in the sample splicing text data may be labeled based on the starting argument symbol [B] and the ending argument symbol [E], that is, the i-th character in the sample splicing text data is replaced with [B] [S1] [E]. If the i-th character in the sample splicing text data is the second sample argument (that is, $s_i$=$a_2$), the i-th character in the sample splicing text data is replaced with the second sample argument symbol [S2]. The position of the second sample argument in the sample splicing text data may be labeled based on the starting argument symbol [B] and the ending argument symbol [E], that is, the i-th character in the sample splicing text data is replaced with [B] [$S_2$] [E]. If the i-th character in the sample splicing text data is not the first sample argument and is not the second sample argument, the i-th character in the sample splicing text data is kept unchanged. Through the above process, the sample text sequence data is obtained. The i is a positive integer and is less than or equal to the number of characters included in the sample splicing text data.

After the sample splicing text data is generated, it is also possible to directly input the sample splicing text data into the initial language representation network for semantic feature extraction without replacing the sample symbols of the sample splicing text data.

The process of generating the sample text sequence data based on the sample dialog text and the sample argument pair in the sample dialog text can be considered as a data preprocessing process for the sample dialog text and the sample argument pair in the sample dialog text.

Step 501C. Perform semantic feature extraction on the sample text sequence data to obtain the sample text semantic information.

After data preprocessing is performed on the sample dialog text and the sample argument pair, the sample text sequence data obtained after data preprocessing may be input into the initial language representation network, semantic feature extraction is performed on the sample text sequence data by the initial language representation network, and then related sample text semantic information is obtained.

As the sample text sequence data includes a variety of data, such as sample dialog phrases (words included in the sample dialog text) and sample argument pairs, semantic representations related to different types of data are extracted respectively in the process of semantic feature extraction.

In an illustrative example, the process of performing semantic feature extraction on the sample text sequence data may include step one and step two.

Step one: Perform hidden layer feature extraction on the sample global semantic symbols in the sample text sequence data, the N sample dialog phrases, the first sample argument symbol and the second sample argument symbol respectively to obtain a sample global hidden state corresponding to the sample global semantic symbols, sample phrase hidden states respectively corresponding to the N sample dialog phrases, a first initial sample argument hidden state corresponding to the first sample argument symbol and a second initial sample argument hidden state corresponding to the second sample argument symbol.

The sample text sequence data includes the sample global semantic symbol, the first sample argument symbol, the second sample argument symbol and the N sample dialog phrases. The sample dialog phrases are sample words or sample characters that form the sample dialog text in the sample text sequence data. For example, if the sample text sequence data is [CLS] [B]$S_1$[E]:$t_1$, [B]$S_2$[E]:$t_2$, $s_3$:$t_3$ . . . , $s_m$:$t_m$[SEP] $S_1$ [SEP] $S_2$ [SEP], then the sample dialog phrase is a word or phrase contained in [B]$S_1$[E]:$t_1$, [B]$S_2$[E]:$t_2$, $s_3$:$t_3$ . . . , $s_m$:$t_m$. The purpose of semantic feature extraction is to extract a global semantic representation and a context semantic representation. Based on the semantic feature extraction task, in one possible implementation, the initial language representation network identifies the input complete sample data through the sample global semantic symbol, and performs global semantic feature extraction on the sample text sequence data to obtain the sample global hidden state (that is, the global semantic representation). Moreover, the initial language representation network also performs context semantic feature extraction on the sample argument pair in the sample text sequence data to obtain the first initial sample argument hidden state corresponding to the first sample argument and the second initial sample argument hidden state corresponding to the second sample argument. At the same time, the initial language representation network also performs context semantic feature extraction on each sample dialog phrase in the sample text sequence data to obtain N sample phrase hidden states corresponding to the sample dialog phrases.

Further, the computer device may perform feature extraction (that is, the hidden layer feature extraction) on the sample text sequence data to obtain the sample text semantic information corresponding to the sample dialog text. Specifically, the sample text splicing symbols include sample global semantic symbols; the sample text sequence data includes sample dialog sequence data corresponding to the sample dialog text; and the sample dialog sequence data includes N sample dialog phrases, N being a positive integer. When the computer device performs feature extraction on the sample text sequence data to obtain the sample text semantic information corresponding to the sample dialog text, specifically the computer device performs hidden layer feature extraction on the sample global semantic symbols in the sample text sequence data, the N sample dialog phrases, the first sample argument symbol and the second sample argument symbol respectively to obtain the sample global hidden state corresponding to the sample global semantic symbols, the sample phrase hidden states respectively corresponding to the N sample dialog phrases, the first initial sample argument hidden state corresponding to the first sample argument symbol and the second initial sample argument hidden state corresponding to the second sample argument symbol. The sample global hidden state, the N sample phrase hidden states, the first initial sample argument hidden state and the second initial sample argument hidden state are determined as the sample text semantic information corresponding to the sample dialog text.

Step two: Determine the sample global hidden state, the N sample phrase hidden states, the first initial sample argument hidden state and the second initial sample argument hidden state as the sample text semantic information corresponding to the sample dialog text.

The sample text semantic information includes a global semantic representation and context semantic representations. The global semantic representation is the sample global hidden state. The context semantic representations are the N sample phrase hidden states, the first initial sample argument hidden state and the second initial sample argument hidden state, that is, the computer device determines the extracted sample global hidden state, the N sample phrase hidden states, the first initial sample argument hidden state and the second initial sample argument hidden state as the sample text semantic information.

Specifically, the computer device may obtain the sample global relationships between the N sample dialog phrases and the sample global semantic symbol, between the first sample argument symbol and the sample global semantic symbol, and between the second sample argument symbol and the sample global semantic symbol respectively based on the initial language representation network, performs feature fusion on the sample global relationships, and generates the sample global hidden state corresponding to the sample global semantic symbol. Hidden layer feature extraction is performed on the N sample dialog phrases, the first sample argument symbol and the second sample argument symbol respectively to obtain the sample phrase hidden states respectively corresponding to the N sample dialog phrases, the first initial sample argument hidden state corresponding to the first sample argument symbol and the second initial sample argument hidden state corresponding to the second sample argument symbol.

For example, referring to FIG. 7, FIG. 7 is a principle diagram of an initial relationship prediction model according to an exemplary embodiment of this disclosure. As shown in FIG. 7, the initial relationship prediction model includes a language representation task 701, a relationship prediction task 702, a phrase prediction task 703, and a trigger word prediction task 704. In the extraction stage of the sample text semantic information, the computer device obtains a training sample 7011. The training sample 7011 includes a sample dialog text 701*a* and a sample argument pair 701*b*. If the sample dialog text 701*a* is "$a_1$:Mom! $a_2$: sweetie . . . ", the sample argument pair 701*b* includes a first sample argument $a_1$ and a second sample argument $a_2$. Data preprocessing (that is, sample data splicing processing and sample symbol replacement processing) is performed on the training sample 7011 to obtain sample text sequence data 7012 (the starting argument symbol and the ending argument symbol are not shown in the present embodiment). The data preprocessing process is: splicing the sample dialog text 701*a* and the sample argument pair 701*b* based on the sample text splicing symbols to generate sample splicing text data. The sample splicing text data may be "[CLS]$a_1$:Mom! $a_2$:Sweetie . . . [SEP]$a_1$[SEP] $a_2$ [SEP]". Further, the first sample argument $a_1$ in the sample splicing text data is replaced with the first sample argument symbol $S_1$, and the second sample argument $a_2$ in the sample splicing text data is replaced with the second sample argument symbol $S_2$, so as to obtain sample text sequence data 7012. The sample text sequence data 7012 is "[CLS] $S_1$:Mom! $S_2$:Sweetie . . . [SEP] $S_1$ [SEP] $S_2$ [SEP]". The semantic feature extraction process is as follows: performing hidden layer feature extraction (semantic feature extraction) on the sample text sequence data 7012 to obtain sample text semantic information 7013 corresponding to the sample text sequence data 7012; further, performing global semantic feature extraction on the sample text sequence data 7012 based on a sample global semantic symbol "[CLS]" to obtain a sample global hidden state "$h^{[CLS]}$" corresponding to the sample text sequence data 7012. At the same time, context semantic feature extraction is performed on the N sample dialog phrases in the sample text sequence data 7012 respectively to obtain sample phrase hidden states corresponding to the N sample dialog phrases, that is, obtain N sample phrase hidden states, for example, a sample phrase hidden state "$h_1^{a_1}$" corresponding to a sample dialog phrase "$S_1$" (a subscript 1 indicates the first sample argument appearing in the sample text sequence data 7012), a sample phrase hidden state "hi" corresponding to a sample dialog phrase "Mom" (i indicates the i-th sample dialog phrase in the N sample dialog phrases), and a sample phrase hidden state $$\text{``}h_1^{a_2}\text{''}$$

. . . corresponding to a sample dialog phrase "$S_2$". At the same time, semantic feature extraction is performed on the sample argument pair to obtain a first initial sample argument hidden state $$\text{``}h_j^{a_1}\text{''}$$

corresponding to a first sample argument symbol, and a second initial sample argument hidden state $$\text{``}h_j^{a_2}\text{''}$$

corresponding to a second sample argument symbol; j represents the j-th first sample argument symbol or the second sample argument symbol appearing in the sample text sequence data 7012. In the sample text sequence data 7012, the number of the first sample argument symbols and the second sample argument symbols may be the same or different. The sample global hidden state, the N sample phrase hidden states, the first initial sample argument hidden state and the second initial sample argument hidden state are determined as the sample text semantic information corresponding to the sample dialog text.

Step 502: Predict a predictive argument relationship between the sample arguments based on the sample text semantic information.

In one possible implementation, after the computer device obtains the sample text semantic information, as the sample text semantic information includes the global semantic information of the sample dialog text and the context semantic information corresponding to the sample arguments, correspondingly, the argument relationship between the sample arguments may be predicted based on the sample text semantic information, that is, the predictive argument relationship between the first sample argument and the second sample argument is obtained.

If there is need to predict the argument relationship between the first sample argument and the second sample argument in the sample argument pair, firstly, there is need to obtain the sample text semantic information related to the sample arguments; it can be known from the sample text sequence data that the sample arguments appear in the sample dialog text and the sample argument pair; and correspondingly, there is need to obtain the semantic representation corresponding to each sample argument in the sample dialog text and the semantic representation corresponding to each sample argument in the sample argument pair from the sample text semantic information.

As the sample argument pair includes the first sample argument and the second sample argument, correspondingly, the process of determining the sample text semantic information related to the sample arguments may include: the process of determining the semantic representation corresponding to the first sample argument and the process of determining the semantic representation corresponding to the second sample argument. In an illustrative example, step 502 may include steps 502A-502F.

Step 502A: Obtain at least one first sample phrase hidden state corresponding to the first sample argument symbols from the N sample phrase hidden states included in the sample text semantic information.

The process of determining the semantic representation related to the first sample argument is as follows: obtaining N sample phrase hidden states from the sample text semantic information, and determining at least one first sample phrase hidden state corresponding to the first sample argument symbol (first sample argument) from the N sample phrase hidden states; at the same time, obtaining the first initial sample argument hidden state from the sample text semantic information, and then determining the semantic representation corresponding to the first sample argument based on the first sample phrase hidden state and the first initial sample argument hidden state.

Step 502B. Perform maximum pooling processing on each of the first sample phrase hidden states and the first initial sample argument hidden state to obtain a first sample argument hidden state corresponding to the first sample argument symbol;

As the sample dialog text includes a plurality of first sample arguments, correspondingly, a plurality of first sample phrase hidden states corresponding to the first sample arguments are correspondingly extracted in the process of semantic feature extraction. In order to integrate the plurality of first sample phrase hidden states and the first initial sample argument hidden state, in one possible implementation, maximum pooling processing is performed on each of the first sample phrase hidden states and the first initial sample argument hidden state to obtain the first sample argument hidden state corresponding to the first sample argument symbol.

In other words, the process of determining the first sample argument hidden states is as follows: obtaining semantic feature representations corresponding to the first sample argument symbols from the sample text semantic information (including the first sample phrase hidden states extracted from the sample dialog text part and the first initial sample argument hidden states extracted from the sample argument pair part), and performing maximum pooling processing on all the semantic feature representations to obtain the first sample argument hidden states.

As shown in FIG. 7, $$h_1^{a_1}, h_2^{a_1} \dots$$

represent a plurality of first sample phrase hidden states obtained from the sample text semantic information, $$h_j^{a_1}$$

represents the first initial text argument hidden state, and after maximum pooling processing is performed on $$h_1^{a_1}, h_2^{a_1} \dots$$

and $$h_j^{a_1},$$

the first sample argument hidden state $h^{a_1}$ corresponding to the first sample argument symbol may be obtained.

Step 502C: Obtain at least one second sample phrase hidden state corresponding to the second sample argument symbol from the N sample phrase hidden states.

The process of determining the semantic representation related to the second sample argument is as follows: obtaining N sample phrase hidden states from the sample text semantic information, and determining at least one second sample phrase hidden state corresponding to the second sample argument symbol (second sample argument) from the N sample phrase hidden states; at the same time, obtaining the second initial sample argument hidden state from the sample text semantic information, and then determining the semantic representation corresponding to the second sample argument based on the second sample phrase hidden state and the second initial sample argument hidden state.

Step 502D: Perform maximum pooling processing on each of the second sample phrase hidden states and the second initial sample argument hidden state to obtain a second sample argument hidden state corresponding to the second sample argument symbol.

As the sample dialog text includes a plurality of second sample arguments, correspondingly, a plurality of second sample phrase hidden states corresponding to the second sample arguments are correspondingly extracted in the process of semantic feature extraction. In order to integrate the plurality of second sample phrase hidden states and the second initial sample argument hidden state, in one possible implementation, maximum pooling processing is performed on each of the second sample phrase hidden states and the second initial sample argument hidden state to obtain the second sample argument hidden state corresponding to the second sample argument symbol.

In other words, the process of determining the second sample argument hidden states is as follows: obtaining semantic feature representations corresponding to the second sample argument symbols from the sample text semantic information (including the second sample phrase hidden states extracted from the sample dialog text part and the second initial sample argument hidden states extracted from the sample argument pair part), and performing maximum pooling processing on all the semantic feature representations to second sample argument hidden states.

As shown in FIG. 7, $$h_1^{a_2}, h_2^{a_2} \dots$$

represent a plurality of second sample phrase hidden states obtained from the sample text semantic information, $$h_j^{a_2}$$

represents the second initial text argument hidden state, and after maximum pooling processing is performed on $$h_1^{a_2}, h_2^{a_2} \dots$$

and $$h_j^{a_2},$$

the second sample argument hidden state $h^{a_2}$ corresponding to the second sample argument symbol may be obtained.

Step 502E: Splice the sample global hidden state, the first sample argument hidden state and the second sample argument hidden state to obtain sample hidden state information.

In the process of predicting the relationship between the sample arguments, not only corresponding semantic feature representations (the first sample argument hidden state and the second sample argument hidden state) of the sample arguments are needed, but also relationship prediction based on the global semantic of the sample dialog text is also needed. Therefore, in one possible implementation, the sample global hidden state is obtained from the sample text semantic information, and then argument relationship prediction is performed based on the sample global hidden state, the first sample argument hidden state and the second sample argument hidden state.

In an embodiment, in order to input the three hidden state information into the initial relationship prediction network together, it is necessary to splice the sample global hidden state, the first sample argument hidden state and the second sample argument hidden state to obtain the sample hidden state information, and then the sample hidden state information is input into the initial relationship prediction network for argument relationship prediction.

In an illustrative example, the sample global hidden state may be expressed as $h^{[CLS]}$, the first sample argument hidden state may be expressed as $h^{a_1}$, the second sample argument hidden state may be expressed as $h^{a_2}$, and the sample hidden state information may be expressed as $h=[h^{[CLS]}; h^{a_1}; h^{a_2}]$.

Step 502F: Predict a predictive argument relationship between the first sample argument and the second sample argument based on the sample hidden state information.

In one possible implementation, after the sample hidden state information is obtained, the sample hidden state information may be input into the initial relationship prediction network, and the initial relationship prediction network predicts the predictive argument relationship between the first sample argument and the second sample argument based on the sample hidden state information.

As shown in FIG. 7, in the relationship prediction task 702, argument relationship prediction is performed based on the sample hidden state information 7021 (including the sample global hidden state $h^{[CLS]}$, the first sample argument hidden state $h^{a1}$, and the second sample argument hidden state $h^{a2}$) to obtain the predictive argument relationship corresponding to the first sample argument and the second sample argument.

In the embodiment of this disclosure, the initial relationship prediction model includes the initial relationship prediction network, and the N sample dialog phrases include the first sample argument symbol, the second sample argument symbol, and other sample dialog phrases in addition to except the first sample argument and the second sample argument. In a case that the predictive argument relationship between the first sample argument and the second sample argument is predicted based on the sample text semantic information, the computer device may obtain the first sample phrase hidden state corresponding to the first sample argument symbol from the N sample phrase hidden states included in the sample text semantic information based on the initial relationship prediction network, and performs maximum pooling processing on the first sample phrase hidden state and the first initial sample argument hidden state to obtain the first sample argument hidden state of the first sample argument symbol, obtains the second sample phrase hidden state corresponding to the second sample argument symbol from the N sample phrase hidden states, and performs maximum pooling processing on the second sample phrase hidden state and the second initial sample argument hidden state to obtain the second sample argument hidden state of the second sample argument symbol. The first sample argument hidden state and the second sample argument hidden state may also be generated in the shared encoder (or the initial language representation network in the above embodiment). In the initial relationship prediction model, the first sample argument hidden state and the second sample argument hidden state obtained by the shared encoder are input into the initial relationship prediction network. Further, the computer device may splice the sample global hidden state, the first sample argument hidden state and the second sample argument hidden state to obtain the sample hidden state information. The predictive argument relationship between the first sample argument and the second sample argument is predicted based on the sample hidden state information.

In order to further improve the prediction accuracy of the argument relationship, after the computer device obtains the sample hidden state information, the computer device may also perform semantic enhancement on the sample hidden state information, and then performs argument relationship prediction based on the enhanced sample enhancement semantic information.

In an exemplary embodiment, step 502F may include step three to step five.

Step three: Perform semantic enhancement on the sample hidden state information to obtain the sample enhancement semantic information;

The network with a semantic enhancement function such as a highway neural network or another neural network with a semantic enhancement function may be used for performing semantic enhancement on the sample hidden state information. In other words, the initial relationship prediction model may also include the highway neural network which is used for performing semantic enhancement on the extracted semantic information.

In one possible implementation, the sample hidden state information is input into the highway neural network, semantic enhancement is performed on the sample hidden state information by the highway neural network to extract deeper semantic features and obtain the sample enhancement semantic information, and then argument relationship prediction is performed based on the sample enhancement semantic information.

Step four: Determine the sample relationship prediction probability of M kinds of candidate argument relationships corresponding to the first sample argument and the second sample argument based on the sample enhancement semantic information, M being a positive integer; and Before the initial relationship prediction model is trained, M kinds of candidate argument relationships are set in advance. The task of the initial relationship prediction network is to predict the predictive argument relationship between the first sample argument and the second sample argument based on the input sample enhancement semantic information, which belongs to the sample relationship prediction probability of M kinds of candidate argument relationships.

In one possible implementation, the sample enhancement semantic information is input into the initial relationship prediction network, and the initial relationship prediction network predicts the sample relationship prediction probability that the first sample argument and the second sample argument belong to various candidate argument relationships based on the global semantic information, context semantic information and argument related semantic information in the sample enhancement semantic information.

Step five: Determine a candidate argument relationship corresponding to the maximum sample relationship prediction probability as the predictive argument relationship between the first sample argument and the second sample argument.

After various sample relationship prediction probabilities output by the initial relationship prediction network are obtained, the candidate argument relationship corresponding to the maximum sample relationship prediction probability is determined as the predictive argument relationship between the first sample argument and the second sample argument by default.

Further, in a case that the predictive argument relationship between the first sample argument and the second sample argument is predicted based on the sample hidden state information, semantic enhancement is performed on the sample hidden state information to obtain the sample enhancement semantic information. The computer device may perform semantic enhancement on the sample hidden state information based on a fusion network. The fusion network may be any network that may perform semantic enhancement, such as a network including one or at least two highway networks, predicts the sample relationship prediction probability of M kinds of candidate argument relationships corresponding to the first sample argument and the second sample argument based on the sample enhancement semantic information, and determines the candidate argument relationship with the maximum sample relationship prediction probability as the predictive argument relationship between the first sample argument and the second sample argument. M is a positive integer.

In other possible implementations, the sample hidden state information may be directly input into the initial relationship prediction network with no need for semantic enhancement. The initial relationship prediction network predicts the predictive argument relationship between the first sample argument and the second sample argument based on the global semantic information, context semantic information and argument-related semantic information included in the sample hidden state information.

Step 503: Generate the first loss according to the actual argument relationship and the predictive argument relationship between the sample arguments.

In order to make the initial relationship prediction model learn more effective semantic features, the model parameters need to be updated based on the prediction loss of each round. For the argument relationship prediction task, in one possible implementation, the argument relationship prediction loss, that is, the first loss, may be generated according to the actual argument relationship and the predictive argument relationship corresponding to the sample argument pair, so that the model parameters of the initial relationship prediction model may be updated based on the first loss later.

Further, the computer device may generate the first loss according to the actual argument relationship and the predictive argument relationship between the first sample argument and the second sample argument. The first loss may be a binary cross entropy loss, a logarithmic loss or a squared loss between the actual argument relationship and the predictive argument relationship, which is not limited here.

Specifically, as shown in FIG. 7, the first sample phrase hidden state, that is, $$\text{``}h_1^{a_1}\text{''}$$

and the like corresponding to the first sample argument symbol $S_1$ is obtained from the N sample phrase hidden states included in the sample text semantic information. Maximum pooling processing is performed on the first sample phrase hidden state and the first initial sample argument hidden state $$\text{``}h_1^{a_1}\text{''}$$

to obtain the first sample argument hidden state $$h^{a_1}$$

of the first sample argument symbol. The second sample phrase hidden state, that is, $$\text{``}h_1^{a_2}\text{''}$$

and the like corresponding to the second sample argument symbol $S_2$ is obtained from the N sample phrase hidden states. Maximum pooling processing is performed on the second sample phrase hidden state and the second initial sample argument hidden state $$\text{``}h_j^{a_2}\text{''}$$

to obtain the second sample argument hidden state of the second sample argument symbol. In the relationship prediction task 702, the sample global hidden state $h^{[CLS]}$, the first sample argument hidden state $h^{a_1}$ and the second sample argument hidden state $h^{a_2}$ are spliced to obtain the sample hidden state information 7021. The predictive argument relationship between the first sample argument and the second sample argument is predicted based on the sample hidden state information 7021. The sample hidden state information 7021 may be recorded as h, $h=[h^{[CLS]}; h^{a_1}; h^{a_2}]$. The sample global hidden state represents the global semantic information in the sample text sequence data, and integrates the relationship between each phrase in the sample text sequence data and the sample global semantic symbol respectively. The first sample argument hidden state represents local semantic information related to the first sample argument. The second sample argument hidden state represents local semantic information related to the second sample argument. The sample global hidden state $h^{[CLS]}$, the first sample argument hidden state $h^{a_1}$ and the second sample argument hidden state $h^{a_2}$ are spliced to obtain the sample hidden state information 7021, so that the sample hidden state information may include the global semantic information, the local semantic information and the like in the sample text sequence data, and features in the sample text sequence data can be extracted more comprehensively, thus improving the accuracy of relationship prediction.

Step 504: Obtain the hidden characters in the sample dialog text.

As the training samples (the sample dialog text and the sample argument pairs) need to be used not only for the argument relationship prediction task, but also for the speaker prediction task (hidden character prediction task), and the purpose of the speaker prediction task is to predict the hidden or hidden characters in the sample dialog text, therefore, in one possible implementation, the sample dialog text input into the initial relationship prediction model is the dialog text being covered or hidden, that is, there is the original dialog text, and after the original dialog text is hidden, the sample dialog text can be obtained.

The process of performing hiding processing on the original dialog text to obtain the sample dialog text may include step six to step eight.

Step six: Obtain the original dialog text and the sample argument pair.

The original dialog text is a dialog text that has not been subjected to hidden processing. Each sample argument in the sample argument pair also belongs to the original dialog text.

Step seven: Determine the hidden characters based on the sample argument pair in response to the argument type of at least one sample argument in the sample argument pair being a speaker argument.

The speaker prediction task (initial phrase prediction network) is used for predicting covered speakers, so that the initial relationship prediction model may learn speaker features, and then assists the speaker-related argument relationship prediction; and correspondingly, it is necessary to determine corresponding characters in the covered original dialog text based on speaker arguments in the sample argument pair. Therefore, in one possible implementation, in a case that there is at least one speaker argument in the sample argument pair, the hidden characters that need to be hidden in the original sample dialog text may be determined based on the speaker arguments.

If the argument types of the two sample arguments included in the sample argument pair are both speaker arguments, any sample argument can be randomly selected, and phrases corresponding to the sample arguments in the original dialog text are determined as hidden characters. In an embodiment, if the sample argument pair only includes a single speaker argument, a phrase corresponding to the speaker argument in the original dialog text is directly determined as a hidden character.

Step eight: Perform hiding processing on the original dialog text based on the hidden characters to obtain the sample dialog text.

In one possible implementation, after the hidden characters are determined, hiding processing may be performed on the phrases corresponding to the hidden characters in the original dialog text, then the original dialog text subjected to the hiding processing is determined as the sample dialog text, and subsequent tasks such as semantic feature extraction, argument relationship prediction, trigger word prediction and hidden character prediction may be performed.

In an exemplary example, the original dialog text is: $d=s_1:t_1, s_2:t_2, s_1:t_i \ldots, s_m:t_m$, and the sample argument pair is $(s_1, s_2)$. Each sample argument included in the sample argument pair is a speaker argument, and $s_1$ may be identified as a hidden character. Correspondingly, the sample dialog text obtained after hiding processing may be expressed as: $d=s_1:t_1, s_2:t_2, C:t_i \ldots, s_m:t_m$, and C represents a symbol after the sample argument $s_1$ is subjected to hiding processing.

The hiding processing may be to replace the hidden characters with other meaningless characters, or to garble the hidden characters, or to use other hiding methods, which is not limited by the embodiment of this disclosure.

As the sample arguments in the original dialog text also need to participate in the subsequent argument relationship prediction process, therefore, in a case that hiding processing is performed on the original dialog text based on the hidden characters, all hidden characters (sample arguments) included in the original dialog text cannot be subjected to hiding processing, but the hidden characters in the original dialog text are randomly covered with a preset probability.

Schematically, the preset probability may be 10%, that is, 10% of the hidden characters in the original dialog text are randomly covered. For example, if the original dialog text includes 10 hidden characters, 1 hidden character is randomly selected from the 10 hidden characters and then is subjected to hiding processing, and thus, the sample dialog text is obtained.

The initial phrase prediction network needs to predict the covered or hidden characters in the sample dialog text based on the sample text semantic information, and correspondingly, the hidden characters (actual hidden characters) need to be input in advance, so that the computer device may obtain the hidden characters in the sample dialog text, so as to calculate the prediction loss of the hidden characters later based on hidden character prediction results and the hidden characters.

Step 505: Predict predictive characters corresponding to the hidden characters based on the sample text semantic information.

In the embodiment of this disclosure, the sample text semantic information output by the initial language representation network is shared by the initial relationship prediction network, the initial phrase prediction network and the initial trigger word prediction network respectively. Therefore, in one possible implementation, the initial phrase prediction network may also predict the hidden characters in the sample dialog text based on the sample text semantic information to obtain the predictive characters.

In the process of hidden character prediction, only the semantic feature representations corresponding to the hidden characters in the sample dialog text are needed. In an exemplary example, step 505 may include step 505A to step 505B.

Step 505A: Determine a mask hidden state corresponding to the hidden characters from the sample text semantic information, the mask hidden state being used for representing the semantic information corresponding to the hidden characters in the sample dialog text.

As it is necessary to predict the hidden characters based on the extracted semantic information in the hidden character prediction task (speaker prediction task) and only semantic information related to the hidden character is needed to predict the hidden characters, therefore, in one possible implementation, it is necessary to obtain the sample phrase hidden state corresponding to the hidden character from the sample text semantic information, and the sample phrase hidden state is determined as the mask hidden state, so that the mask hidden state is used for predicting the hidden characters.

Step 505B: Predict the predictive characters corresponding to the hidden characters based on the mask hidden state.

As the mask hidden state can represent the semantic information corresponding to the hidden characters in the sample dialog text, the predictive characters can be predicted based on the mask hidden state.

In an exemplary example, if the sample dialog text may be expressed as: $d=s_1:t_1, s_2:t_2, C:t_i \ldots, s_m:t_m$, where C stands for the hidden speaker argument, after the sample dialog text and the sample argument pair are subjected to data preprocessing and input into the initial language representation network, the sample text semantic information output from the initial language representation network may be obtained. The sample text semantic information includes the mask hidden state $$"h_i^{mask}"$$

corresponding to a hidden character "C", then the mask hidden state $$"h_i^{mask}"$$

is input into the initial phrase prediction network for hidden character prediction, and thus, the predictive characters are obtained. As shown in FIG. 7, in the phrase prediction task 703, a mask hidden state $$"h_i^{mask}"$$

corresponding to the hidden characters is obtained from the sample text semantic information 7013, the mask hidden state $$\text{``}h_i^{mask}\text{''}$$

is input into the initial phrase prediction network, and the predictive characters corresponding to the mask hidden state $$\text{``}h_i^{mask}\text{''}$$

can be obtained.

Step 506: Generate the second loss according to the hidden characters and the predictive characters.

In order to make the initial relationship prediction model learn speaker-related features more effectively to further assist the relationship prediction of speaker arguments, in one possible implementation, the prediction loss of the hidden characters, that is, the second loss, is determined based on the hidden characters and the predictive characters output by the initial phrase prediction network and is used for updating the initial relationship prediction model.

Further, the computer device may generate the second loss according to the hidden characters and the predictive characters. The second loss may be a binary cross entropy loss, a logarithmic loss or a squared loss between the predictive characters and the hidden characters, which are not limited here.

Step 507: Generate trigger word detection text data according to the actual argument relationship and the sample text semantic information.

In the embodiment of this disclosure, the initial relationship prediction model further includes an initial trigger word prediction network. Trigger words refer to words that can clearly indicate the argument relationship in the text. The trigger word prediction network is used for predicting the trigger words in the sample dialog text according to the sample text semantic information.

In a case that the initial trigger word prediction network determines whether each sample dialog phrase in the sample dialog text is a trigger word, that is, determine whether each sample dialog phrase has a specific connection with an argument relationship, the actual argument relationship and the semantic representation of each sample dialog phrase need to be obtained. Therefore, in one possible implementation, the trigger word detection text data may be generated according to the actual argument relationship and the sample text semantic information, and is input into the initial trigger word prediction network, and the initial trigger word prediction network predicts the trigger words in the sample dialog text.

In an illustrative example, step 507 may further include step 507A and step 507B.

Step 507A: Determine an argument relationship vector corresponding to the actual argument relationship.

As the sample text semantic information is in the form of feature vector, in order to splice the sample text semantic information and the actual argument relationship, in one possible implementation, the actual argument relationship is also transformed into the form of feature vector, that is, the argument relationship vector corresponding to the actual argument relationship is obtained.

Step 507B: Splice the argument relationship vector and the sample text semantic information to generate the trigger word detection text data.

After the argument relationship vector is obtained, the argument relationship vector and the sample text semantic information may be spliced to generate the trigger word detection text data, which is used for the subsequent trigger word prediction process.

In the trigger word prediction task, the initial trigger word prediction network needs to identify whether each sample dialog phrase in the sample dialog text is a trigger word, and correspondingly, when splicing is performed, the argument relationship vector and each sample phrase hidden state in the sample text semantic information need to be spliced. In an illustrative example, step 507B may further include the following step nine to step eleven.

Step nine: Determine at least one sample phrase hidden state from the sample text semantic information, the sample phrase hidden state being used for representing the semantic information corresponding to the sample dialog phrases in the sample dialog text.

The sample dialog phrase is each character included in the sample dialog text. For example, if the sample dialog text is: $a_1$:Mom! $a_2$:Sweetie . . . ", the sample dialog phrases include $a_1$, Mom, $a_2$, Sweetie, and the like.

In order to enable the initial trigger word prediction network to identify whether each sample dialog phrase in the sample dialog text is a trigger word, in one possible implementation, the semantic information corresponding to each sample dialog phrase, that is, the sample phrase hidden state, is determined from the sample text semantic information, and then the sample phrase hidden state and the argument relationship vector are spliced, which is used for subsequently predicting whether the sample dialog phrase is the trigger word.

Step ten: Splice the argument relationship vector and the sample phase hidden state to obtain a trigger word detection text corresponding to the sample dialog phrases.

For each sample phrase hidden state, the sample phrase hidden state and the argument relationship vector are spliced to obtain the trigger word detection text corresponding to the sample dialog phrases, that is to say, the trigger word detection text includes the argument relationship vector and the sample phrase hidden state.

As shown in FIG. 7, the sample phrase hidden state "$h_i$" corresponding to the sample dialog phrase "Mom" is obtained from the sample text semantic information 7013, and the sample phrase hidden state "$h_i$" and the argument relationship vector "$e^r$" are spliced to obtain the trigger word detection text "[$e^r$, $h_i$]" corresponding to the sample dialog phrase "Mom".

Step eleven: Determine the trigger word detection text corresponding to the sample dialog phrases as the trigger word detection text data.

In order to improve the prediction efficiency of initial trigger words, in one possible implementation, the sample phrase hidden state corresponding to each of the sample dialog phrases and the argument relationship vector are spliced to obtain the trigger word detection text corresponding to each of the sample dialog phrases, then the set of the trigger word detection texts is determined as the trigger word detection text data, which is jointly input into the initial trigger word prediction network, and whether each sample dialog phrase is a trigger word is predicted by the initial trigger word prediction network at the same time.

In an exemplary example, if the sample dialog text includes five sample dialog phrases, the sample phrase hidden states $h_1$, $h_2$, $h_3$, $h_4$, $h_5$ corresponding to the sample dialog phrases are obtained; the sample phrase hidden states and the argument relationship vector are spliced to obtain five trigger word detection texts: $[e^r, h_1]$, $[e^r, h_2]$, $[e^r, h_3]$, $[e^r, h_4]$, $[e^r, h_5]$; and the five trigger word detection texts form the trigger word detection text data, which is used for being input into the initial trigger word prediction network for trigger word prediction.

Step 508: Predict predictive sequence labels corresponding to the trigger word detection text data.

In one possible implementation, the computer device inputs the trigger word detection text data into the initial trigger word prediction network. The initial trigger word prediction network determines whether the sample dialog phrase has a specific connection with the actual argument relationship based on the semantic information of each sample dialog phrase and the actual argument relationship, thereby determining whether the sample dialog phrase is the trigger word.

In an illustrative example, step 508 may further include step 508A and step 508B.

Step 508: Perform trigger word prediction based on the trigger word detection text data to obtain a predictive phrase label corresponding to each of the sample dialog phrases, the predictive phrase label being used for representing a trigger word type to which the sample dialog phrase belongs.

In the embodiment of this disclosure, in the process of performing trigger word prediction on the sample dialog phrases by the initial trigger word prediction network, the sample dialog text is labeled by a BIO label mode, that is, the predictive sequence label formed by BIO is output by the trigger word prediction network, where I indicates that the sample dialog phrase at this position is the middle character of the trigger word, B indicates that the sample dialog phrase at this position is the beginning character of the trigger word, and O indicates that the sample dialog phrase at this position is not the trigger word.

Other label modes may be adopted, such as a BIOES label mode, where B indicates that the sample dialog phrase at this position is the beginning character of the trigger word, I indicates that the sample dialog phrase at this position is the middle character of the trigger word, O indicates that the sample dialog phrase at this position is not the trigger word, E indicates that the sample dialog phrase at this position is the end character of the trigger word, and S indicates that the sample dialog phrase is a single character (having no connection with the trigger word).

In one possible implementation, the trigger word detection text data is input into the initial trigger word prediction network, and trigger word prediction is performed, so that the predictive phrase labels corresponding to the various sample dialog phrases may be obtained, that is, whether the sample dialog phrase is the trigger word and whether the sample dialog phrase is the beginning character, the middle character or the end character of the trigger word may be determined.

In an embodiment, in the process of performing trigger word prediction, the initial phrase prediction network predicts the probability that the sample dialog phrases corresponds to various candidate phrase labels; if the label mode adopts a BIO label method, the candidate phrase labels are of three types: B, I and O; if the label mode adopts a BIOES label method, the candidate phrase labels are of five types: B, I, O, E, S; and then the candidate phrase label corresponding to the maximum probability is determined as the predictive phrase label corresponding to the sample dialog phrase.

Step 508B: Determine the predictive phrase label corresponding to each of the sample dialog phrases as the predictive sequence label.

The predictive phrase labels corresponding to the various sample dialog phrases can form a predictive sequence label corresponding to the sample dialog text, that is, the predictive sequence label is a set of the predictive phrase labels.

As shown in FIG. 7, the trigger word detection text data is $[e^r, h_1]$, $[e^r, h_2]$ . . . $[e^r,h_i]$, $[e^r,h_{i+1}]$ and $[e^r,h_{i+2}]$. A prediction label sequence obtained by inputting the trigger word detection text data into the initial trigger word prediction network is: O, O . . . B, I, O. It can be seen that prediction labels corresponding to the first sample dialog phrase, the second sample dialog phrase and the i+2nd sample dialog phrase are O, which indicates that the first dialog sample phrase, the second dialog sample phrase and the i+2nd dialog sample phrase are not trigger words; a prediction label corresponding to the i-th dialog sample phrase is B, which indicates that the i-th dialog sample phrase is the beginning character of the trigger word; a prediction label corresponding to the i+1st dialog sample phrase is I, which indicates that the i+1st dialog sample phrase is the middle character of the trigger word; the i+2nd dialog sample phrase is not a trigger word; and then based on the prediction label sequence, it can be seen that the prediction trigger word in the sample dialog text is formed by the i-th sample dialog phrase and the (i+1)-th sample dialog phrase.

Step 509: Generate the third loss according to actual sequence labels and the predictive sequence labels corresponding to the trigger word detection text data.

To make the initial relationship prediction model learn the semantic features related to the trigger words more effectively, in one possible implementation, the trigger word prediction loss, that is, the third loss, is determined based on the actual sequence labels and predictive sequence labels corresponding to the trigger word detection text data and is used for updating the initial relationship prediction model.

In an embodiment, the actual sequence labels are manually labeled in advance, and are associated with the corresponding sample dialog text and stored in the computer device, so that the computer device may obtain the corresponding actual sequence labels during calculating the third loss.

Further, the computer device may generate the third loss according to the actual sequence labels and the predictive sequence labels in the trigger word detection text data, and the third loss may be a binary cross entropy, a logarithmic loss or a squared loss, etc. between the actual sequence label and the predictive sequence label, which is not limited here.

In the model training process of the initial relationship prediction model, the actual argument relationship corresponding to the sample argument pair is used for generating the trigger word detection text data. In the model testing stage, in order to verify the prediction accuracy of the initial relationship prediction model in the three tasks, the predictive argument relationship output by the initial relationship prediction network is used for generating the trigger word detection text data, that is, the computer device may obtain the predictive argument relationship obtained in the initial relationship prediction network, performs vector conversion on the predictive argument relationship to obtain a prediction relationship vector corresponding to the predictive argument relationship, splices the prediction relationship vector and the N sample phrase hidden states to generate trigger word test data, predicts test sequence labels in the trigger word test data, and performs optimum adjustment on the initial relationship prediction network based on the fourth loss generated by the test sequence labels and the actual sequence labels.

Step 510: Perform model parameter adjustment on the initial relationship prediction model according to the first loss, the second loss and the third loss to generate the dialog relationship prediction model.

In one possible implementation, the joint loss is determined according to the first loss, the second loss and the third loss, then the initial relationship prediction model is trained based on the joint loss, and the model parameters of each sub-network in the initial relationship prediction model are updated. The dialog relationship prediction model is obtained after several rounds of training until the loss converges.

After the training is finished, a test sample set may be used for performing model test on the dialog relationship prediction model, thereby further optimizing the dialog relationship prediction model.

The initial phrase prediction network and the initial trigger word prediction network are needed for auxiliary training in the training process of the initial dialog relationship prediction model. After the training for the initial dialog relationship prediction model is finished, in order to simplify the model, the initial phrase prediction network and the initial trigger word prediction network in the initial dialog relationship prediction model may be deleted to obtain the dialog relationship prediction model, that is, the dialog relationship prediction model can only include the language representation network and the relationship prediction network. The dialog relationship prediction model may also include a semantic enhancement network.

In the embodiment of this disclosure, the dialog relationship prediction model is used for predicting the target argument relationship between the target argument pairs in the target dialog text. Specifically, the computer device may generate a model loss according to the first loss, the second loss and the third loss, and performs model parameter adjustment on the initial relationship prediction model based on the model loss, specifically, performs model parameter adjustment on each network in the initial relationship prediction model to generate the dialog relationship prediction model. In an embodiment, the first loss is recorded as $L_1$, the second loss is recorded as $L_2$, the third loss is recorded as $L_3$, and the model loss is obtained based on the first loss, the second loss and the third loss and is "$L=L1+L2+L3$". Model parameter adjustment is performed on the initial relationship prediction model based on the model loss. Through the above process, the relationship prediction task, the phrase prediction task, the trigger word prediction task and the like are jointly trained in a multi-task learning mode, so that the information of the phrase prediction task, the trigger word prediction task and the like may be supplied to the relationship prediction task, that is, the relationship prediction task may obtain feature information of arguments based on the phrase prediction task and may obtain trigger word information based on the trigger word prediction task, and thus, the relationship prediction task may obtain the information in the sample dialog text more comprehensively and improve the accuracy of relationship prediction. Multi-task Learning (MTL) is a machine learning method that considers multiple related tasks at the same time, which improves the generalization performance of single task learning by using internal relationships among tasks, that is, improves the generalization performance of relationship prediction tasks by using the internal relationships among the relationship prediction task, the phrase prediction task and the trigger word prediction task.

In the embodiment of this disclosure, the sample dialog text and the sample argument pairs in the sample dialog text are input into the initial relationship prediction model, and feature extraction is performed on the sample dialog text and the sample argument pairs in the initial relationship prediction model to obtain sample text semantic information corresponding to the sample dialog text. The sample argument pair includes a first sample argument and a second sample argument. The predictive argument relationship between the first sample argument and the second sample argument is predicted based on the sample text semantic information, and a first loss function is generated according to the actual argument relationship and the predictive argument relationship between the first sample argument and the second sample argument. The hidden characters in the sample dialog text and the sample argument pairs are obtained, predictive characters corresponding to the hidden characters are predicted, and a second loss function is generated according to the hidden characters and the predictive characters. The trigger word detection text data is generated according to the actual argument relationship and the sample text semantic information, the predictive sequence labels in the trigger word detection text data are predicted, and a third loss function is generated according to the actual sequence labels and the predictive sequence labels in the trigger word detection text data. Model parameter adjustment is performed on the initial relationship prediction model according to the first loss function, the second loss function and the third loss function to generate the dialog relationship prediction model. The dialog relationship prediction model is used for predicting the target argument relationship between the target argument pairs in the target dialog text. Through the above process, dialog relationship extraction is divided into three related subtasks according to this disclosure, which are respectively the relationship prediction task, the phrase prediction task and the trigger word prediction task. The model is jointly trained by combining the three subtasks, the effective information learned from the phrase prediction task and the trigger word prediction task may be fully utilized, and the relationship prediction task is influenced based on the effective information, thus improving the accuracy of the dialog relationship processing.

The above embodiment mainly describes the training process of the initial relationship prediction model. After the training for the initial relationship prediction model is completed and the dialog relationship prediction model is generated, the dialog relationship prediction model may be used in different dialog relationship prediction scenarios.

Further, referring to FIG. 8, FIG. 8 is a flowchart of a method for processing a dialog relationship according to an exemplary embodiment of this disclosure. The embodiment of this disclosure is illustrated by taking an application of the method to the computer device shown in FIG. 1 as an example. The method includes the following steps:

Step 801: Input a target dialog text and target argument pairs into the dialog relationship prediction model, and perform semantic feature extraction on the target dialog text and the target argument pairs in the dialog relationship prediction model to obtain target text semantic information corresponding to the target dialog text, each target argument in the target argument pairs belonging to the target dialog text.

The dialog relationship prediction model may only include the language representation network and the relationship prediction network. The language representation network is used for extracting target text semantic information corresponding to the target dialog text. The relationship prediction network is used for predicting a target argument relationship between the target arguments in the target argument pair. The dialog relationship prediction model may also include a semantic enhancement network which is used for performing semantic enhancement on the target text semantic information.

In one possible implementation, the target dialog text and the target argument pairs are input into the language representation network in the dialog relationship prediction model, and semantic feature extraction is performed on the target dialog text and the target argument pairs by the language representation network to obtain the target text semantic information corresponding to the target dialog text.

Before semantic feature extraction is performed, it is necessary to perform data preprocessing on the target dialog text and the target argument pairs. The process may refer to the data preprocessing process of the sample dialog text and the sample argument pairs in the above embodiment, which is not repeated in the embodiment of this disclosure.

In the embodiment of this disclosure, the computer device splices the target dialog text and the target argument pairs based on target text splicing symbols to generate the target splicing text data. A first target argument in the target splicing text data is replaced with a first target argument symbol, and a second target argument in the target splicing text data is replaced with a second target argument symbol, thereby generating target text sequence data. Semantic feature extraction is performed on the target text sequence data to obtain target text semantic information corresponding to the target dialog text. The target text splicing symbol is the same as the sample text splicing symbol, but the names are different only at different stages. For example, the sample text splicing symbol includes a sample global semantic symbol, a sample separator, etc, it is assumed that the sample global semantic symbol is [CLS] and the sample separator is [SEP], then the target text splicing symbol includes a target global semantic symbol, a target separator, etc, the target global semantic symbol is [CLS], and the target separator is [SEP]. Further, the target text sequence data includes the target dialog sequence data corresponding to the target dialog text. The target dialog sequence data includes v target dialog phrases, where v is a positive integer. The computer device may perform hidden layer feature extraction respectively on the target global semantic symbol, the v target dialog phrases, the first target argument symbol and the second target argument symbol in the target text sequence data to obtain a target global hidden state corresponding to the target global semantic symbol, target phrase hidden states corresponding to N target dialog phrases, a first initial target argument hidden state corresponding to the first target argument symbol and the second initial target argument hidden state corresponding to the second target argument symbol. The target global hidden state, the v target phrase hidden states, the first initial target argument hidden state and the second initial target argument hidden state are determined as the target text semantic information corresponding to the target dialog text.

In the model application stage, the target dialog text and the target argument pairs may be input by a user, that is, the user inputs the target dialog text and at least one target argument pair for which the argument relationship needs to be extracted into the computer device. The computer device obtains the target dialog text and the target argument pairs. In other possible implementations, the target argument pairs may need to be obtained from dialog consultation information by the computer device. The dialog consultation information may be user consultation sentences, reading comprehension questions, etc.

The computer device may directly obtain the target dialog text provided by a target user and the target argument pairs in the target dialog text. Alternatively, the computer device may obtain the target dialog text and dialog consultation information associated with the target dialog text, parses the dialog consultation information, and extracts the target argument pairs in the dialog consultation information. For example, the obtained dialog consultation information is "What is the relationship between speaker 2 and speaker 4?", the dialog consultation information is parsed, the target argument pair in the dialog consultation information is extracted, and it can be obtained that the target argument pair includes the first target argument "Speaker 2", and the second target argument "Speaker 4". In an embodiment, if the computer device obtains the first target argument in the dialog consultation information, the computer device parses the dialog consultation information to obtain a related argument type, obtains an argument corresponding to the related argument type from the target dialog text, and determines the argument corresponding to the related argument type as the second target argument. The related argument type includes but is not limited to a person type, an article type or an animal type, and the number of the second target arguments is one or at least two. Based on the dialog relationship prediction model, the target argument relationship between the first target argument and each second target argument is obtained.

Step 802: Predict the target text semantic information based on the relationship prediction network in the dialog relationship prediction model to obtain a target argument relationship between the first target argument and the second target argument.

In one possible implementation, after the computer device obtains the target text semantic information corresponding to the target dialog text, the computer device may determine the target global semantic information, the first target argument hidden state corresponding to the first target argument and the second target argument hidden state corresponding to the second target argument from the target text semantic information, determines the target global semantic information, the first target argument hidden state and the second target argument hidden state as the target hidden state information, and inputs the target hidden state information into the relationship prediction network. Argument relationship prediction is performed by the relationship prediction network to obtain the target argument relationship between the first target argument and the second target argument.

The determination process of the first target argument hidden state may refer to the determination process of the first sample argument hidden state in the above embodiment, and the determination process of the second target argument hidden state may also refer to the determination process of the second sample argument hidden state in the above embodiment, which is not repeated in the embodiment of this disclosure.

In the embodiment of this disclosure, the dialog relationship prediction model is obtained by training the initial relationship prediction model based on the first loss, the second loss, and the third loss. The initial relationship prediction model includes the initial relationship prediction network, the initial phrase prediction network, and the initial trigger word prediction network. The first loss function is generated by the actual argument relationship and the predictive argument relationship between the first sample argument and the second sample argument. The actual argument relationship is obtained by predicting the sample text semantic information corresponding to the sample dialog text where the first sample argument and the sample argument are in the initial relationship prediction network. The second loss is generated by the hidden characters and the predictive characters. The predictive characters are obtained by predicting the hidden characters in the sample dialog text in the initial phrase prediction network. The third loss is generated by the actual sequence labels and the predictive sequence labels in the trigger word detection text data. The trigger word detection text data is generated in the initial trigger word prediction network according to the actual argument relationship and the sample text semantic information. The predictive sequence labels are obtained by predicting the trigger word detection text data.

After the computer device may perform model parameter adjustment on the initial relationship prediction model, the phrase prediction task area and the trigger word prediction task area are deleted to obtain the dialog relationship prediction model. The model can be simplified, so that resources occupied by the dialog relationship prediction model are reduced. Or, after the computer device may perform model parameter adjustment on the initial relationship prediction model, the phrase prediction task area and the trigger word prediction task area are reserved to obtain the dialog relationship prediction model, thus facilitating the further optimization of the dialog relationship prediction model. At this time, the model structure of the dialog relationship prediction model can be as shown in FIG. 7. Referring to FIG. 6, in the training stage, the computer device performs joint training based on the relationship prediction task, the phrase prediction task and the trigger word prediction task to generate the dialog relationship prediction model. In the testing stage, the relationship prediction result is obtained directly based on the relationship prediction task, and is used for representing the argument relationship between the target argument pairs input into the dialog relationship prediction model.

Further, the computer device may generate target question answering data according to the target dialog text, the dialog consultation information and the target argument pairs, and adds the target question answering data to the question answering database.

In an embodiment, if the computer device obtains the first target argument in the dialog consultation information, the computer device parses the dialog consultation information to obtain the related argument type. Specifically, if computer device obtains the target argument relationship in the dialog consultation information, the computer device obtains the related argument type corresponding to the target argument relationship, obtains a candidate argument corresponding to the related argument type from the target dialog text, predicts the candidate argument relationship between the first target argument and the candidate argument based on the dialog relationship prediction model, and determines the candidate argument whose candidate argument relationship is the target argument relationship as the second target argument. The first target argument and the second target argument form the target argument pair. The second target argument is the reply data of the dialog consultation information. The number of the candidate arguments is one or at least two. For example, the dialog consultation information is "Who is the boss of Speaker 2? (Who is the boss of user 2)", the first target argument "Speaker 2" and the target argument relationship "boss" are obtained in the dialog consultation information. The related argument type corresponding to the target argument relationship "boss" is a person type. It is assumed that the computer device obtains candidate arguments corresponding to the person type from the target dialog text, and the candidate arguments include "Speaker 1, Speaker 3 and Speaker 4", the candidate argument relationship between the first target argument and each candidate argument is predicted based on the dialog relationship prediction model. It is assumed that the candidate argument relationship between the first target argument and the candidate argument "Speaker 1" is "subordinate", the candidate argument relationship between the first target argument and the candidate argument "Speaker 3" is "friend", and the candidate argument relationship between the first target argument and the candidate argument "Speaker 4" is "boss", the candidate argument "Speaker 4" is determined as the second target argument. The second target argument is the reply data of the dialog consultation information, that is, Speaker 4 is the boss of Speaker 2

Specifically, this disclosure may be applied to the information extraction business in the field of cultural tourism, optimize the relationship prediction ability, quickly extract effective knowledge information from introduction documents, and customize a privatization knowledge map. Alternatively, this disclosure may be applied to a question answering system to help improve the knowledge base of the question answering system and ensure that the question answering system can answer questions of users more effectively, which is not limited here.

Further, in the model training stage, the input parameters of the initial relationship prediction model may also include task types, task versions, regions for use, input data paths, output data paths and task identification, etc., which is not limited here. See Table 1 for details:

TABLE 1

| Parameter name | Required | Type | Description |
|---|---|---|---|
| Action (task type) | Yes | String | Common parameters, the value of the present interface: DialogRETrain |
| Version (task version) | Yes | String | Common parameters, the value of the present interface: XXXX-XX-XX |
| Region (region for use) | Yes | String | For common parameters, refer to the list of regions supported by the product. |
| InputDatasetPath (Input data path) | Yes | String | Path of data set self-contained or having been uploaded by the user |
| OutputModelPath (Output data path) | Yes | String | Path to store the model to be trained |
| ProjectId (task identification) | Yes | Integer | An task ID may be configured. If there is no configuration, the default task ID such as 0 may be used for representation. |

In Table 1, the task type (Action) is used for indicating whether the task type of the present model prediction task is a training type or a test type, etc., and the task type at this time may be the training type; the task version (Version) is used for indicating the version number or version generation time, etc. of the model used; the region for use (Region) is used for representing the list of regions, product types or the list of users to which the model can be applied; the input data path (InputDatasetPath) is used for indicating the storage location path of the training sample, etc. used in the training model, etc.; the output data path (OutputModelPath) is used for representing the storage location path of the model to be trained, etc.; and the task identification (ProjectId) is used for indicating the identification (ID) of the present model prediction task. Each input parameter in Table 1 may not be input into the initial relationship prediction model, and is only used as a log record of the present model training stage.

The output parameters of the initial relationship prediction model may also include training completion time and task request identification, etc., which are not limited here. See Table 2 for details:

TABLE 2

| Parameter name | Type | Description |
|---|---|---|
| TimeOfTrain | Integer | The time taken to complete model training |
| RequestId | String | Unique request ID being returned for each request. RequestId of the request needs to be provided during locating a problem. |

In Table 2, the training completion time (TimeOfTrain) is used for indicating the duration of completing the present model prediction task or the time when the present model prediction task is completed; the task request identification (RequestId) is used for indicating the request identification (ID) for requesting the present model prediction task, is the unique identifier of the request, and may be used for indicating the scene change of the task, the user ID that initiates the request or the number of requests.

Further, in the model test or application stage, the input parameters of the dialog relationship prediction model may also include task types, task versions, regions for use, input data paths, output data paths and task identification, etc., which is not limited here. See Table 3 for details:

TABLE 3

| Parameter name | Required | Type | Description |
|---|---|---|---|
| Action (task type) | Yes | String | Common parameters, the value of the present interface: DialogRETrain |
| Version (task version) | Yes | String | Common parameters, the value of the present interface: XXXX-XX-XX |
| Region (region for use) | Yes | String | For common parameters, refer to the list of regions supported by the product. |
| InputDatasetPath (Input data path) | Yes | String | Path of test dataset self-contained or having been uploaded by the user |
| OutputModelPath (Output data path) | Yes | String | Path for storing the model having been trained |
| ProjectId (task identification) | Yes | Integer | An task ID may be configured. If there is no configuration, the default task ID such as 0 may be used for representation. |

In Table 3, the task type (Action) is used for indicating whether the task type of the present model prediction task is a training type or a test type, etc., and the task type at this time may be the test type or a prediction type; Version is used for indicating the version number or version generation time, etc. of the model used; Region is used for representing the list of regions, product types or the list of users to which the model can be applied; the input data path (InputDatasetPath) is used for indicating the storage location path of data used for testing the model or using the model, such as the storage path of the target dialog text, etc.; the output data path (OutputModelPath) is used for representing the storage location path of the model having been trained, etc.; and the task identification (ProjectId) is used for indicating the identification (ID) of the present model prediction task. Each input parameter in Table 3 may not be input into the dialog relationship prediction model, and is only used as a log record of the present model training stage.

The output parameters of the dialog relationship prediction model may also include an output result data path and task request identification, etc., which are not limited here. See Table 4 for details:

TABLE 4

| Parameter name | Type | Description |
|---|---|---|
| OutputDatasetPath | Integer | Output result data path |
| RequestId | String | Unique request ID being returned for each request. RequestId of the request needs to be provided during locating a problem. |

In table 4, the output result data path (OutputDatasetPath) is used for indicating the storage location path of data obtained in the present model prediction task, such as the target argument relationship. The present path may be the location path in the blockchain network, or the storage path in the computer device, or the storage path indicated by the cloud storage technology, etc., which is not limited here. The task request identification (RequestId) is used for indicating the request identification (ID) for requesting the present model prediction task, is the unique identifier of the request, and may be used for indicating the scene change of the task, the user ID that initiates the request or the number of requests.

Figure 9:
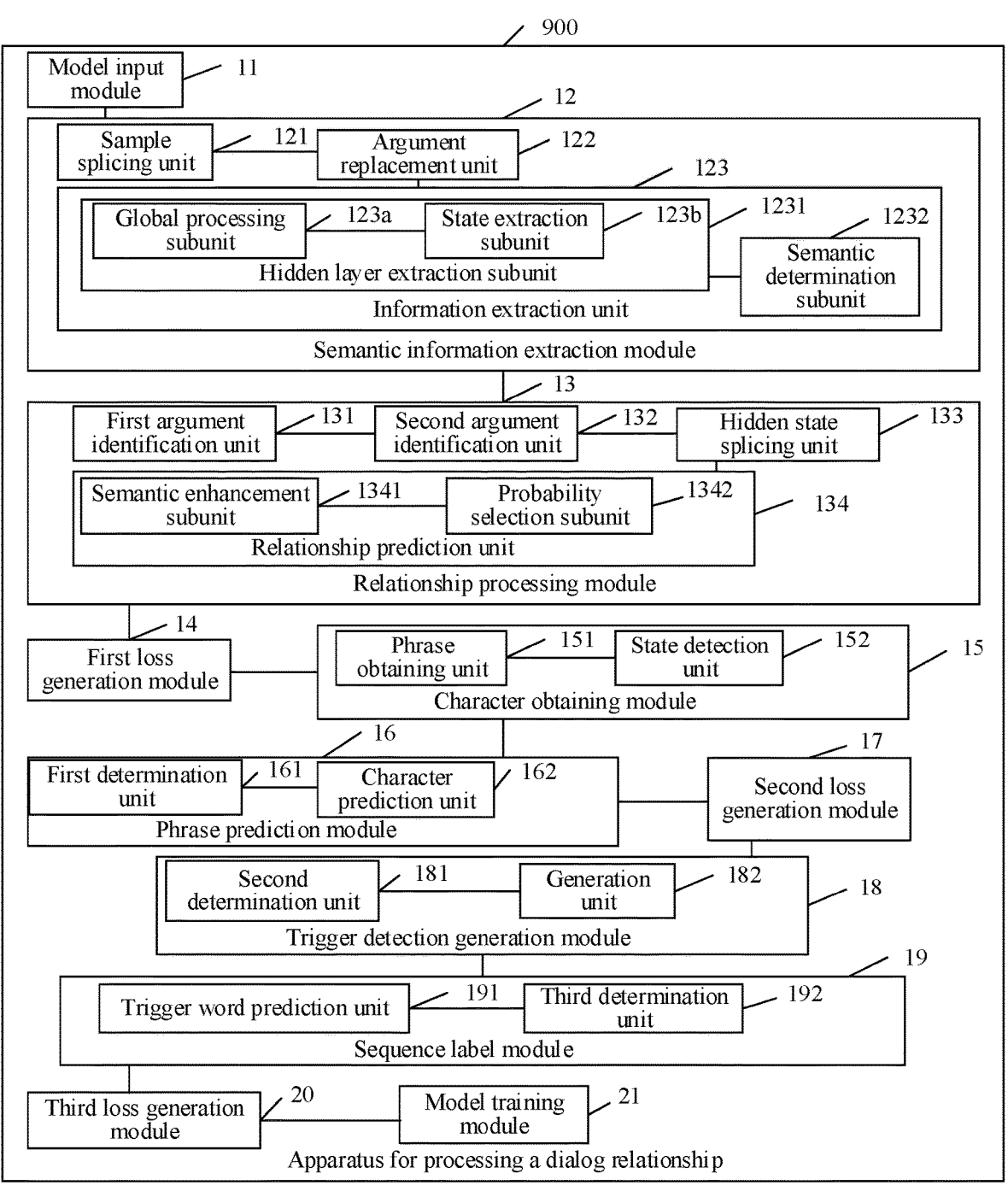
FIG. 9 is a schematic diagram of an apparatus for processing a dialog relationship provided by an exemplary embodiment of this disclosure.

Referring to FIG. 9, FIG. 9 is a schematic structural diagram of an apparatus for processing a dialog relationship according to an exemplary embodiment of this disclosure. It is to be understood that the apparatus for processing a dialog relationship may be a computer program (including a program code, etc.) running on a computer device. For example, the apparatus for processing a dialog relationship may be application software; and the apparatus may be configured to perform the corresponding steps in the method provided in the embodiments of this disclosure. As shown in FIG. 9, the dialog relationship processing device 900 may include a model input module 11, a semantic information extraction module 12, a relationship processing module 13, a first loss generation module 14, a character obtaining module 15, a phrase prediction module 16, a second loss generation module 17, a trigger detection generation module 18, a sequence label module 19, a third loss generation module 20, and a model training module 21.

The model input module 11 and the semantic information extraction module 12 are configured to perform semantic feature extraction on a sample dialog text and sample argument pairs by an initial relationship prediction model to obtain sample text semantic information, each sample argument in the sample argument pairs belonging to the sample dialog text.

The relationship processing module 13 and the first loss generation module 14 are configured to perform argument relationship prediction based on the sample text semantic information, and determine a first loss based on an argument relationship prediction result, the argument relationship prediction result being used for representing a relationship between the sample arguments.

The character obtaining module 15, the phrase prediction module 16, and the second loss generation module 17 are configured to perform hidden character prediction based on the sample text semantic information, and determine a second loss based on a hidden character prediction result, the hidden character prediction result being used for representing hidden characters in the sample dialog text.

The trigger detection generation module 18, the sequence label module 19, and the third loss generation module 20 are configured to perform trigger word prediction based on the sample text semantic information and an actual argument relationship, and determine a third loss based on a trigger word prediction result, the actual argument relationship being a labeled argument relationship corresponding to the sample arguments, and the trigger word prediction result being used for representing positions of trigger words in the sample dialog text.

The model training module 21 is configured to train the initial relationship prediction model based on the first loss, the second loss and the third loss to obtain a dialog relationship prediction model.

In a preferred implementation, the model input module 11 and the semantic information extraction module 12 are further configured to input the sample dialog text and the sample argument pair into the initial relationship prediction model, and perform semantic feature extraction on the sample dialog text and the sample argument pairs in the initial relationship prediction model to obtain the sample text semantic information;

the relationship processing module 13 is configured to predict a predictive argument relationship between the sample arguments based on the sample text semantic information;

the first loss generation module 14 is configured to generate the first loss according to the actual argument relationship and the predictive argument relationship between the sample arguments;

the character obtaining module 15 is configured to obtain the hidden characters in the sample dialog text;

the phrase prediction module 16 is configured to predict predictive characters corresponding to the hidden characters based on the sample text semantic information;

the second loss generation module 17 is configured to generate the second loss according to the hidden characters and the predictive characters;

the trigger detection generation module 18 is configured to generate trigger word detection text data according to the actual argument relationship and the sample text semantic information;

the sequence label module 19 is configured to predict predictive sequence labels corresponding to the trigger word detection text data;

the third loss generation module 20 is configured to generate the third loss according to actual sequence labels and the predictive sequence labels corresponding to the trigger word detection text data; and the model training module 21 is configured to perform model parameter adjustment on the initial relationship prediction model according to the first loss, the second loss and the third loss to generate a dialog relationship prediction model, the dialog relationship prediction model being configured to predict a target argument relationship between target argument pairs in the target dialog text.

In a preferred implementation, the phrase prediction module 16 includes:

a first determination unit 161, configured to determine a mask hidden state corresponding to the hidden characters from the sample text semantic information, the mask hidden state being used for representing the semantic information corresponding to the hidden characters in the sample dialog text; and a character prediction unit 162, configured to predict the predictive characters corresponding to the hidden characters based on the mask hidden state.

In a possible implementation, the apparatus further includes:

a sample obtaining module, configured to obtain original dialog texts and the sample argument pairs;

a hidden character determination module, configured to determine the hidden characters based on the sample argument pairs in response to the argument type of at least one sample argument in the sample argument pairs being a speaker argument; and a hiding processing module, configured to perform hiding processing on the original dialog texts based on the hidden characters to obtain the sample dialog text.

In a possible implementation, the trigger detection generation module 18 includes:

a second determination unit 181, is configured to determine an argument relationship vector corresponding to the actual argument relationship; and a generation unit 182, configured to splice the argument relationship vector and the sample text semantic information to generate the trigger word detection text data.

In a possible implementation, the generation unit 182 is further configured to:

determine at least one sample phrase hidden state from the sample text semantic information, the sample phrase hidden state being used for representing semantic information corresponding to sample dialog phrases in the sample dialog text;

splice the argument relationship vector and the sample phrase hidden state to obtain trigger word detection texts corresponding to the sample dialog phrases; and determine the trigger word detection text corresponding to the sample dialog phrases as the trigger word detection text data.

The sequence label module 19 includes:

a trigger word prediction unit 191, configured to perform trigger word prediction based on the trigger word detection text data to obtain a predictive phrase label corresponding to each of the sample dialog phrases, the predictive phrase label being used for representing a trigger word type to which the sample dialog phrase belongs; and a third determination unit 192, configured to determine the predictive phrase label corresponding to each of the sample dialog phrases as the predictive sequence label.

The semantic information extraction module 12 includes:

a sample splicing unit 121, configured to splice the sample dialog text and the sample argument pairs based on sample text splicing symbols in the initial relationship prediction model to generate sample splicing text data;

an argument replacing unit 122, configured to replace a first sample argument in the sample splicing text data with a first sample argument symbol, and replacing a second sample argument in the sample splicing text data with a second sample argument symbol, to generate sample text sequence data, the sample argument pair including the first sample argument and the second sample argument; and an information extracting unit 123, configured to perform semantic feature extraction on the sample text sequence data to obtain the sample text semantic information corresponding to the sample dialog text.

The sample text splicing symbols include sample global semantic symbols; the sample text sequence data includes sample dialog sequence data corresponding to the sample dialog text; and the sample dialog sequence data includes N sample dialog phrases, N being a positive integer.

The information extracting unit 123 further includes:

a hidden layer extracting subunit 1231, configured to perform hidden layer feature extraction on the sample global semantic symbols in the sample text sequence data, the N sample dialog phrases, the first sample argument symbol and the second sample argument symbol respectively to obtain a sample global hidden state corresponding to the sample global semantic symbols, sample phrase hidden states respectively corresponding to the N sample dialog phrases, a first initial sample argument hidden state corresponding to the first sample argument symbol and a second initial sample argument hidden state corresponding to the second sample argument symbol; and a semantic Determination subunit 1232, configured to determine the sample global hidden state, N sample phrase hidden states, the first initial sample argument hidden state and the second initial sample argument hidden state as the sample text semantic information corresponding to the sample dialog text.

The hidden layer extracting subunit 1231 further includes:

a global processing subunit 123a, configured to obtain sample global relationships between the N sample dialog phrases and the sample global semantic symbol, between the first sample argument symbol and the sample global semantic symbol, and between the second sample argument symbol and the sample global semantic symbol, and perform feature fusion on the sample global relationships to generate the sample global hidden state corresponding to the sample global semantic symbol; and a state extracting subunit 123b, configured to perform hidden layer feature extraction on the N sample dialog phrases, the first sample argument symbol and the second sample argument symbol respectively to obtain the sample phrase hidden states respectively corresponding to the N sample dialog phrases, the first initial sample argument hidden state corresponding to the first sample argument symbol and the second initial sample argument hidden state corresponding to the second sample argument symbol.

The N sample dialog phrases include the first sample argument symbol and the second sample argument symbol.

The relationship processing module 13 includes:

a first argument identification unit 131, configured to obtain at least one first sample phrase hidden state corresponding to the first sample argument symbol from the N sample phrase hidden states included in the sample text semantic information, and perform maximum pooling processing on each of the first sample phrase hidden states and the first initial sample argument hidden state to obtain a first sample argument hidden state corresponding to the first sample argument symbol;

a second argument identification unit 132, configured to obtain at least one second sample phrase hidden state corresponding to the second sample argument symbol from the N sample phrase hidden states, and perform maximum pooling processing on each of the second sample phrase hidden states and the second initial sample argument hidden state to obtain a second sample argument hidden state corresponding to the second sample argument symbol;

a hidden state splicing unit 133, configured to splice the sample global hidden state, the first sample argument hidden state and the second sample argument hidden state to obtain sample hidden state information; and a relationship predicting unit 134, configured to predict a predictive argument relationship between the first sample argument and the second sample argument based on the sample hidden state information.

The relationship predicting unit 134 includes:

a semantic enhancement unit 1341, configured to perform semantic enhancement on the sample hidden state information to obtain sample enhancement semantic information;

a probability selecting subunit 1342, configured to determine the sample relationship prediction probability of M kinds of candidate argument relationships corresponding to the first sample argument and the second sample argument based on the sample enhancement semantic information, M being a positive integer, and determine a candidate argument relationship corresponding to the maximum sample relationship prediction probability as the predictive argument relationship between the first sample argument and the second sample argument.

The embodiment of this disclosure provides a dialog relationship processing device. An initial phrase prediction network and an initial trigger word prediction network are added to the initial relationship prediction model, hidden speaker arguments in the sample dialog text are predicted by the initial phrase prediction network, and trigger words in the sample dialog text that can guide an argument relationship are predicted by the trigger word prediction network, so that additional second loss and third loss are introduced in the loss; auxiliary information which include speaker features and trigger word features are provided for the prediction of the argument relationship, so that the initial relationship prediction model can learn more effective information that is more conducive to the prediction of the argument relationship, and then the prediction accuracy of the argument relationship is improved.

Figure 10:
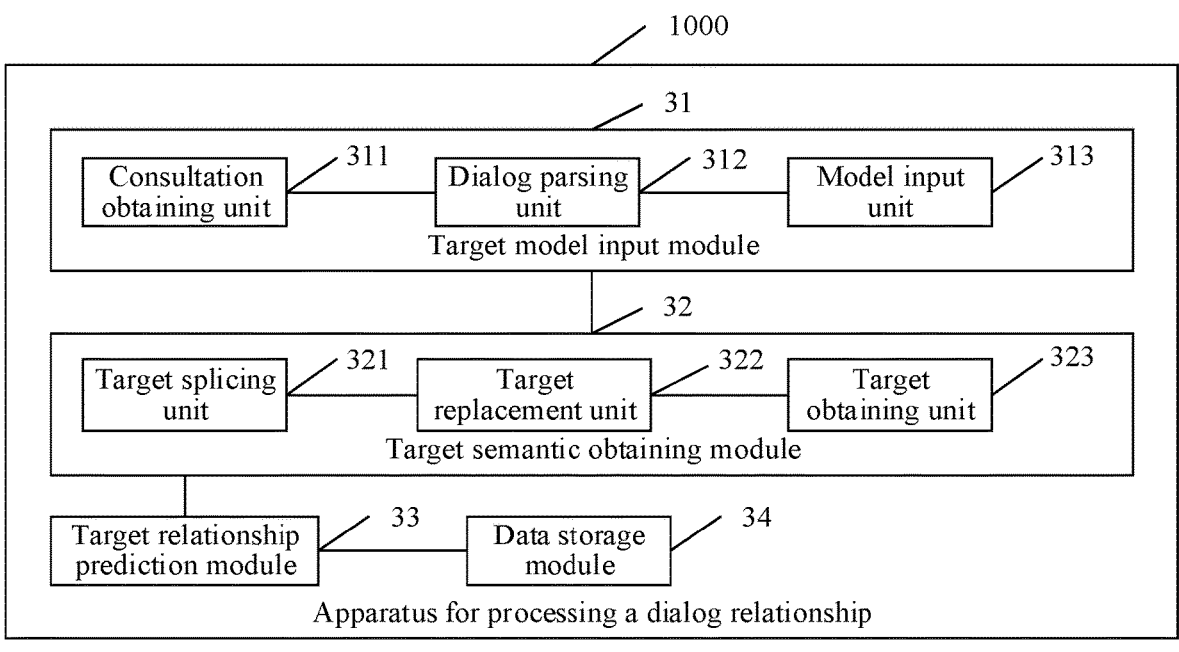
FIG. 10 is a schematic diagram of another apparatus for processing a dialog relationship provided by an embodiment of this disclosure.

Further, referring to FIG. 10, FIG. 10 is a schematic diagram of another apparatus for processing a dialog relationship provided by an embodiment of this disclosure. It is to be understood that the apparatus for processing a dialog relationship may be a computer program (including a program code, etc.) running on a computer device. For example, the apparatus for processing a dialog relationship may be application software; and the apparatus may be configured to perform the corresponding steps in the method provided in the embodiments of this disclosure. As shown in FIG. 10, the dialog relationship processing device 1000 may include a target model input module 31, a target semantic obtaining module 32 and a target relationship prediction module 33.

The target model input module 31 is configured to input target dialog texts and target argument pairs into a dialog relationship prediction model.

The target semantic obtaining module 32 is configured to perform semantic feature extraction on the target dialog texts and the target argument pairs in the dialog relationship prediction model to obtain target text semantic information corresponding to the target dialog texts, each target argument in the target argument pairs belonging to the target dialog text.

The target relationship prediction module 33 is configured to perform argument relationship prediction on the target text semantic information based on the dialog relationship prediction model to obtain a target argument relationship between target arguments, the dialog relationship prediction model being obtained by training with the method for processing a dialog relationship described in the above aspects.

The target semantic obtaining module 32 includes:

a target splicing unit 321, configured to splice the target dialog texts and the target argument pairs based on target text splicing symbols to generate target splicing text data;

a target replacing unit 322, configured to replace a first target argument in the target splicing text data with a first target argument symbol, and replace a second target argument in the target splicing text data with a second target argument symbol, to generate target text sequence data, the target argument pair including the first target argument and the second target argument; and a target obtaining unit 323, configured to perform semantic feature extraction on the sample text sequence data to obtain the sample text semantic information corresponding to the sample dialog text.

The target model input module 31 includes:

a consultation obtaining unit 311, configured to obtain the target dialog texts and dialog consultation information associated with the target dialog texts;

a dialog parsing unit 312, configured to parse the dialog consultation information and extract the target argument pairs indicated by the dialog consultation information; and a model input module 313, configured to input target dialog texts and target argument pairs into a dialog relationship prediction model.

The apparatus 900 further includes:

a data storage module 34, configured to generate target question answering data according to the target dialog texts, the dialog consultation information and the target argument pairs, and add the target question answering data into a question answering database.

Figure 11:
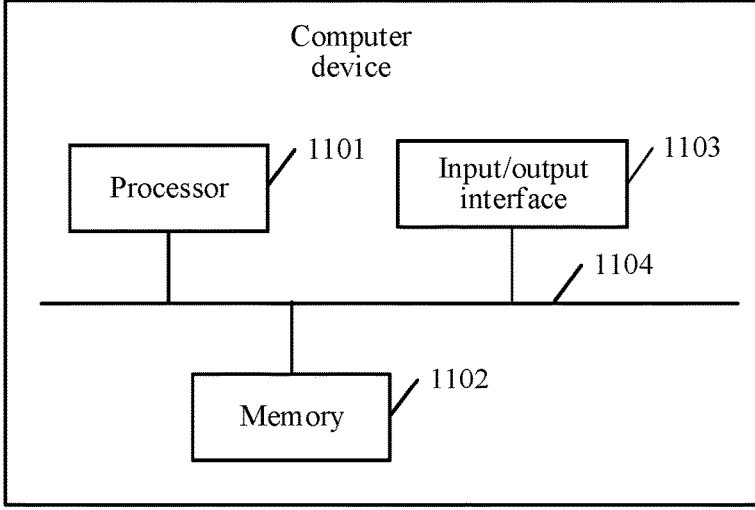
FIG. 11 is a schematic structural diagram of a computer device provided by an embodiment of this disclosure.

Referring to FIG. 11, FIG. 11 is a schematic structural diagram of a computer device according to an exemplary embodiment of this disclosure. As shown in FIG. 11, the computer device in one embodiment of this disclosure may include one or more processors 1101 (processing circuitry), a memory 1102 (a non-transitory computer-readable storage medium), and an input/output interface 1103. The processor 1101, the memory 1102 and the input/output interface 1103 are connected through a bus 1104. The memory 1102 is configured to store the computer programs including program instructions; the input/interface 1103 is configured to receive data and output data, for example, perform data interaction between networks in a model, or perform data interaction between the computer device and user equipment; and the processor 1101 is configured to execute the program instructions stored in the memory 1102.

The processor 1101, when located in the computer device for model training, can perform the following operations:

inputting sample dialog text and sample argument pairs in the sample dialog text into an initial relationship prediction model, performing semantic feature extraction on the sample dialog text and the sample argument pairs in the initial relationship prediction model to obtain sample text semantic information corresponding to the sample dialog text, the sample argument pairs including a first sample argument and a second sample argument; and predicting a predictive argument relationship between the first sample argument and the second sample argument based on the sample text semantic information, and generating a first loss function according to the actual argument relationship and the predictive argument relationship between the first sample argument and the second sample argument; and acquiring hidden characters in the sample dialog text and the sample argument pairs, predicting predictive characters corresponding to the hidden characters, and generating a second loss function according to the hidden characters and the predictive characters;

generating trigger word detection text data according to the actual argument relationship and the sample text semantic information, predicting predictive sequence labels in the trigger word detection text data, and generating a third loss function according to actual sequence labels and the predictive sequence labels in the trigger word detection text data;

performing model parameter adjustment on the initial relationship prediction model according to the first loss, the second loss and the third loss to generate a dialog relationship prediction model, the dialog relationship prediction model being configured to predict a target argument relationship between target argument pairs in the target dialog text.

The processor 1101, when located in the computer device for model prediction, can perform the following operations:

inputting target dialog texts and target argument pairs in the target dialog texts into a dialog relationship prediction model, performing feature extraction on the target dialog texts and the target argument pairs in the dialog relationship prediction model to obtain target text semantic information corresponding to the target dialog texts, the target argument pair including a first target argument and a second target argument; and predicting the target text semantic information based on the relationship prediction network in the dialog relationship prediction model to obtain a target argument relationship between the first target argument and the second target argument.

In some feasible implementations, the processor 1101 may be a central processing unit (CPU). The processor may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any appropriate processor and the like.

The memory 1102 may include a read-only memory and a random access memory, and provides the processor 1101 and the input/output interface 1103 with data and instructions. A part of the memory 1102 may further include a non-volatile random access memory. For example, the memory 1102 may further store information about a device type.

In a specific implementation, the computer device can execute the implementations provided by the above method embodiments through built-in functional modules thereof.

The embodiment of this disclosure provides a computer device, which includes a processor, an input/output interface and a memory. The processor is configured to obtain a computer program in the memory, executes various steps of the method shown in FIG. 4, and performs dialog relationship processing operations. In the embodiment of this disclosure, the initial phrase prediction network and the initial trigger word prediction network are added to the initial relationship prediction model, hidden speaker arguments in the sample dialog text are predicted by the initial phrase prediction network, and the trigger words in the sample dialog text that can guide the argument relationship are predicted by the trigger word prediction network, so that the additional second loss and third loss are introduced to the loss; auxiliary information which include speaker features and trigger word features are provided for the prediction of the argument relationship, so that the initial relationship prediction model can learn effective information that is more conducive to the prediction of the argument relationship, and then the prediction accuracy of the argument relationship is improved.

The embodiment of this disclosure further provides a computer-readable storage medium, which stores a computer program. The computer program is suitable for being loaded by the processor and executing the method for processing a dialog relationship provided by each step in FIG. 4 or FIG. 8. Refer to the implementations provided by each step in FIG. 4 or FIG. 8 for details, which is not repeated here. In addition, the description of beneficial effects of the same method is not described herein again. For technical details that are not disclosed in the computer-readable storage medium embodiments of this disclosure, refer to the descriptions of the method embodiments of this disclosure. As an example, the computer program may be deployed to be executed on one computer device, or deployed to be executed on a plurality of compute devices at the same location, or deployed to be executed on a plurality of compute devices that are distributed in a plurality of locations and interconnected by using a communication network.

The computer-readable storage medium may be the apparatus for processing a dialog relationship provided by any one of the foregoing embodiments or any internal storage unit of the computer device, for example, a hard disk or an internal memory of the computer device. The computer-readable storage medium may also be an external storage device of the computer device, for example, a plug-in hard disk, a smart media card (SMC), a secure digital (SD) card, or a flash card (Flash Card) equipped on the computer device. Further, the computer-readable storage medium may also include both an internal storage unit and an external storage device of the computer device. The computer-readable storage medium is configured to store the computer program and another program and data that are required by the computer device. The computer-readable storage medium may further be configured to temporarily store data that has been output or data to be output.

The embodiments of the present disclosure provide a computer program product or a computer program. The computer program product or the computer program includes computer instructions, and the computer instructions are stored in the computer-readable storage medium. The processor of the computer device reads the computer instructions from the computer-readable storage medium, and executes the computer instructions, so that the computer device executes the methods provided in various alternative modes in FIG. 4 or FIG. 8, and the division of dialog relationship extraction into three related subtasks being respectively the relationship prediction task, the phrase prediction task and the trigger word prediction task is realized. The model is jointly trained by combining the three subtasks. The effective information learned from the phrase prediction task and the trigger word prediction task may be fully utilized, and the relationship prediction task is influenced based on the effective information, thus improving the accuracy of the dialog relationship processing.

In the specification, claims, and accompanying drawings of the embodiments of this disclosure, the terms "first", "second", etc. are used for distinguishing different objects, not to describe a particular order. In addition, terminologies "include", and any variations thereof are intended to cover non-exclusive inclusion. For example, a process, method, product, or device or an apparatus that includes a series of steps or units is not limited to the listed steps or units, instead, further includes a step or unit that is not listed, or further includes another step or unit that is intrinsic to the process, method, product, or device or the apparatus.

A person of ordinary skill in the art may be aware that, in combination with examples of units and algorithm steps described in the embodiments disclosed in this specification, this disclosure may be implemented by using electronic hardware, computer software, or a combination thereof. To clearly describe interchangeability between the hardware and the software, compositions and steps of each example have been generally described according to functions in the descriptions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this disclosure.

In an embodiment, a non-transitory computer-readable storage medium stores computer-readable instructions which, when executed by a computer device, cause the computer device to perform a method for processing a dialog relationship. The method includes performing semantic feature extraction on a sample dialog text and sample statement or speaker pairs by an initial relationship prediction model to obtain sample text semantic information. Each sample statement or speaker in the sample statement or speaker pairs is included in the sample dialog text. The method further includes performing relationship prediction based on the sample text semantic information and an actual statement or speaker relationship, and determining a first loss based on a relationship prediction result. The relationship prediction result represents a relationship between the sample statements or speakers, and the actual statement or speaker relationship is a labeled relationship corresponding to statements or speakers in the sample dialog text. The method further includes performing masked speaker prediction based on the sample text semantic information, and determining a second loss based on a masked speaker prediction result. The masked speaker prediction result represents a prediction of speakers masked in the sample dialog text. The method further includes performing trigger word prediction based on the sample text semantic information, and determining a third loss based on a trigger word prediction result. The trigger word prediction result represents positions of trigger words in the sample dialog text. The method further includes training the initial relationship prediction model based on the first loss, the second loss and the third loss to obtain a dialog relationship prediction model.

The method and related apparatus provided by the embodiments of this disclosure are described with reference to the method flowchart and/or structural schematic diagram provided by the embodiments of this disclosure, and specifically, each flow and/or block of the method flowchart and/or structural schematic diagram and the combination of the flow and/or block in the flowchart and/or block diagram may be realized by computer program instructions. These computer program instructions may be provided to a general-purpose computer, a dedicated computer, an embedded processor, or a processor of another programmable data processing apparatus to generate a machine, so that the instructions executed by the computer device or the processor of the another programmable data processing apparatus generate an apparatus for implementing a specific function in one or more processes in the flowcharts and/or in one or more blocks in the structural schematic diagrams. These computer program instructions may also be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the structural schematic diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the structural schematic diagrams.

A sequence of the steps of the method in the embodiments of this disclosure may be adjusted, and certain steps may also be combined or removed according to an actual requirement.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for processing a dialog relationship, the method comprising:

performing semantic feature extraction on a sample dialog text and sample statement or speaker pairs by an initial relationship prediction model to obtain sample text semantic information, each sample statement or speaker in the sample statement or speaker pairs being included in the sample dialog text;

performing relationship prediction based on the sample text semantic information and an actual statement or speaker relationship, and determining a first loss based on a relationship prediction result, the relationship prediction result representing a relationship between the sample statements or speakers, and the actual statement or speaker relationship being a labeled relationship corresponding to statements or speakers in the sample dialog text;

performing masked speaker prediction based on the sample text semantic information, and determining a second loss based on a masked speaker prediction result, the masked speaker prediction result representing a prediction of speakers masked in the sample dialog text;

performing trigger word prediction based on the sample text semantic information, and determining a third loss based on a trigger word prediction result, and the trigger word prediction result representing positions of trigger words in the sample dialog text;

training the initial relationship prediction model by jointly adjusting model parameters based on the first loss, the second loss and the third loss to obtain a dialog relationship prediction model; and when a dialog text is input into the dialog relationship prediction model, outputting for display a predicted relationship between statements or speakers that is determined by the dialog relationship prediction model.

2. The method according to claim 1, wherein the performing the semantic feature extraction includes:

inputting the sample dialog text and the sample statement or speaker pairs into the initial relationship prediction model, and performing semantic feature extraction on the sample dialog text and the sample statement or speaker pairs in the initial relationship prediction model to obtain the sample text semantic information;

the performing the relationship prediction includes:

predicting a relationship between the sample statements or speakers based on the sample text semantic information; and generating the first loss according to the actual statement or speaker relationship and the predicted relationship between the sample statements or speakers;

the performing the masked speaker prediction includes:

obtaining one or more masked speakers in the sample dialog text;

predicting one or more speakers corresponding to the one or more masked speakers based on the sample text semantic information; and generating the second loss according to the one or more masked speakers and the one or more predicted speakers;

the performing the trigger word prediction includes:

generating trigger word detection text data according to the actual statement or speaker relationship and the sample text semantic information;

predicting one or more sequence labels corresponding to the trigger word detection text data; and generating the third loss according to one or more actual sequence labels and the one or more predicted sequence labels corresponding to the trigger word detection text data; and the training the initial relationship prediction model includes:

performing model parameter adjustment on the initial relationship prediction model according to the first loss, the second loss, and the third loss to generate the dialog relationship prediction model, the dialog relationship prediction model being configured to predict a statement or speaker relationship corresponding to statement or speaker pairs in a target dialog text.

3. The method according to claim 2, wherein the predicting the one or more speakers corresponding to the one or more masked speakers based on the sample text semantic information includes:

determining a masked state corresponding to each of the one or more masked speakers from the sample text semantic information, the masked state representing semantic information corresponding to the one or more masked speakers in the sample dialog text; and predicting the one or more speakers corresponding to the one or more masked speakers based on the masked state.

4. The method according to claim 3, wherein the method further includes:

acquiring an original dialog text and one of the sample statement or speaker pairs;

determining the one or more masked speakers based on the one of the sample statement or speaker pairs in response to the one of the sample statement or speaker pairs including at least one speaker; and performing hiding processing on the original dialog text based on the one or more masked speakers to obtain the sample dialog text.

5. The method according to claim 2, wherein the generating the trigger word detection text data includes:

determining a relationship vector corresponding to the actual statement or speaker relationship; and splicing the relationship vector and the sample text semantic information to generate the trigger word detection text data.

6. The method according to claim 5, wherein the splicing includes:

determining at least one sample dialog phrase from the sample text semantic information;

splicing the relationship vector and the at least one sample dialog phrase to obtain at least one trigger word detection text corresponding to the at least one sample dialog phrase; and determining the trigger word detection text corresponding to each of the sample dialog phrases as the trigger word detection text data; and the predicting one or more sequence labels corresponding to the trigger word detection text data includes:

performing trigger word prediction based on the trigger word detection text data to obtain a predictive phrase label corresponding to each of the sample dialog phrases, the predictive phrase label representing a trigger word type of the sample dialog phrase; and determining the predictive phrase label corresponding to each of the sample dialog phrases as the one or more predicted sequence labels.

7. The method according to claim 1, wherein the performing the semantic feature extraction includes:

splicing the sample dialog text and the sample statement or speaker pairs based on sample text splicing symbols in the initial relationship prediction model to generate sample splicing text data;

replacing a first sample statement or speaker in the sample splicing text data with a first symbol, and replacing a second sample statement or speaker in the sample splicing text data with a second symbol, to generate sample text sequence data, the first sample statement or speaker and the second sample statement or speaker comprising one of the sample statement or speaker pairs; and performing semantic feature extraction on the sample text sequence data to obtain the sample text semantic information.

8. The method according to claim 7, wherein the sample text splicing symbols comprise sample global semantic symbols;

the sample text sequence data includes sample dialog sequence data corresponding to the sample dialog text, and the sample dialog sequence data includes N sample dialog phrases, N being a positive integer;

the performing the semantic feature extraction on the sample text sequence data to obtain the sample text semantic information includes:

performing hidden layer feature extraction on the sample global semantic symbols in the sample text sequence data, the N sample dialog phrases, the first symbol and the second symbol respectively to obtain a sample global hidden state corresponding to the sample global semantic symbols, sample phrase hidden states respectively corresponding to the N sample dialog phrases, a first initial statement or speaker hidden state corresponding to the first symbol and a second initial statement or speaker hidden state corresponding to the second symbol; and determining the sample global hidden state, N sample phrase hidden states, the first initial statement or speaker hidden state and the second initial statement or speaker hidden state as the sample text semantic information corresponding to the sample dialog text.

9. The method according to claim 8, wherein the performing the hidden layer feature extraction includes:

obtaining sample global relationships between the N sample dialog phrases and one of the sample global semantic symbols, between the first symbol and the one of the sample global semantic symbols, and between the second symbol and the one of the sample global semantic symbols, and performing feature fusion on the sample global relationships to generate the sample global hidden state corresponding to the one of the sample global semantic symbols; and performing hidden layer feature extraction on the N sample dialog phrases, the first symbol and the second symbol respectively to obtain the sample phrase hidden states respectively corresponding to the N sample dialog phrases, the first initial statement or speaker hidden state corresponding to the first symbol and the second initial statement or speaker hidden state corresponding to the second symbol.

10. The method according to claim 8, wherein the N sample dialog phrases comprise the first symbol and the second symbol; and the performing the relationship prediction based on the sample text semantic information includes:

obtaining at least one first sample phrase hidden state corresponding to the first symbol from the N sample phrase hidden states contained in the sample text semantic information;

performing maximum pooling processing on each of the first sample phrase hidden states and the first initial statement or speaker hidden state to obtain a first hidden state corresponding to the first symbol;

obtaining at least one second sample phrase hidden state corresponding to the second symbol from the N sample phrase hidden states;

performing maximum pooling processing on each of the second sample phrase hidden states and the second initial statement or speaker hidden state to obtain a second hidden state corresponding to the second symbol;

splicing the sample global hidden state, the first hidden state and the second hidden state to obtain sample hidden state information; and predicting a relationship between the first statement or speaker and the second statement or speaker based on the sample hidden state information.

11. The method according to claim 10, wherein the predicting the relationship between the first statement or speaker and the second statement or speaker based on the sample hidden state information includes:

performing semantic enhancement on the sample hidden state information to obtain sample enhancement semantic information;

determining a sample relationship prediction probability of M kinds of candidate relationships corresponding to the first statement or speaker and the second statement or speaker based on the sample enhancement semantic information, M being a positive integer; and determining a candidate relationship corresponding to a maximum sample relationship prediction probability as the predicted relationship between the first statement or speaker and the second statement or speaker.

12. A method for processing a dialog relationship, the method comprising:

inputting a target dialog text and statement or speaker pairs into a dialog relationship prediction model, and performing semantic feature extraction on the target dialog text and the target statement or speaker pairs in the dialog relationship prediction model to obtain target text semantic information corresponding to the target dialog text, each target statement or speaker in the target statement or speaker pairs being included in the target dialog text; and performing relationship prediction on the target text semantic information based on the dialog relationship prediction model to obtain a target relationship between the target statements or speakers in the target statement or speaker pairs, the dialog relationship prediction model being obtained by the method for processing the dialog relationship according to claim 1.

13. The method according to claim 12, wherein the performing the semantic feature extraction on the target dialog text and the target statement or speaker pairs in the dialog relationship prediction model includes:

splicing the target dialog text and the target statement or speaker pairs based on target text splicing symbols to generate target splicing text data;

replacing a first target statement or speaker in the target splicing text data with a first target symbol, and replacing a second target statement or speaker in the target splicing text data with a second target symbol, to generate target text sequence data, one of the target statement or speaker pairs comprising the first target statement or speaker and the second target statement or speaker; and performing semantic feature extraction on the target text sequence data to obtain the sample text semantic information corresponding to the target dialog text.

14. The method according to claim 12, wherein the inputting target dialog text and target statement or speaker pairs into a dialog relationship prediction model includes:

obtaining the target dialog text and dialog consultation information associated with the target dialog text;

parsing the dialog consultation information and extracting the target statement or speaker pairs indicated by the dialog consultation information; and inputting the target dialog text and the target statement or speaker pairs into the dialog relationship prediction model.

15. An apparatus for processing a dialog relationship, the apparatus comprising:

processing circuitry configured to perform semantic feature extraction on a sample dialog text and sample statement or speaker pairs by an initial relationship prediction model to obtain sample text semantic information, each sample statement or speaker in the sample statement or speaker pairs being included in the sample dialog text;

perform relationship prediction based on the sample text semantic information and an actual statement or speaker relationship, and determine a first loss based on a relationship prediction result, the relationship prediction result representing a relationship between the sample statements or speakers, and the actual statement or speaker relationship being a labeled relationship corresponding to statements or speakers in the sample dialog text;

perform masked speaker prediction based on the sample text semantic information, and determine a second loss based on a masked speaker prediction result, the masked speaker prediction result representing a prediction of speakers masked in the sample dialog text;

perform trigger word prediction based on the sample text semantic information, and determine a third loss based on a trigger word prediction result, and the trigger word prediction result representing positions of trigger words in the sample dialog text;

train the initial relationship prediction model by jointly adjusting model parameters based on the first loss, the second loss and the third loss to obtain a dialog relationship prediction model; and when a dialog text is input into the dialog relationship prediction model, output for display a predicted relationship between statements or speakers that is determined by the dialog relationship prediction model.

16. The apparatus according to claim 15, wherein the processing circuitry is further configured to:

input the sample dialog text and the sample statement or speaker pairs into the initial relationship prediction model, and performing semantic feature extraction on the sample dialog text and the sample statement or speaker pairs in the initial relationship prediction model to obtain the sample text semantic information;

predict a relationship between the sample statements or speakers based on the sample text semantic information;

generate the first loss according to the actual statement or speaker relationship and the predicted relationship between the sample statements or speakers;

obtain one or more masked speakers in the sample dialog text;

predict one or more speakers corresponding to the one or more masked speakers based on the sample text semantic information;

generate the second loss according to the one or more masked speakers and the one or more predicted speakers;

generate trigger word detection text data according to the actual statement or speaker relationship and the sample text semantic information;

predict one or more sequence labels corresponding to the trigger word detection text data;

generate the third loss according to one or more actual sequence labels and the one or more predicted sequence labels corresponding to the trigger word detection text data; and perform model parameter adjustment on the initial relationship prediction model according to the first loss, the second loss, and the third loss to generate the dialog relationship prediction model, the dialog relationship prediction model being configured to predict a statement or speaker relationship corresponding to statement or speaker pairs in a target dialog text.

17. The apparatus according to claim 16, wherein the processing circuitry is further configured to:

determine a masked state corresponding to each of the one or more masked speakers from the sample text semantic information, the masked state representing semantic information corresponding to the one or more masked speakers in the sample dialog text; and predict the one or more speakers corresponding to the one or more masked speakers based on the masked state.

18. The apparatus according to claim 17, wherein the processing circuitry is further configured to:

acquire an original dialog text and one of the sample statement or speaker pairs;

determine the one or more masked speakers based on the one of the sample statement or speaker pairs in response to the one of the sample statement or speaker pairs including at least one speaker; and perform hiding processing on the original dialog text based on the one or more masked speakers to obtain the sample dialog text.

19. The apparatus according to claim 16, wherein the processing circuitry is further configured to:

determine a relationship vector corresponding to the actual statement or speaker relationship; and splice the relationship vector and the sample text semantic information to generate the trigger word detection text data.

20. The apparatus according to claim 19, wherein the processing circuitry is further configured to:

determine at least one sample dialog phrase from the sample text semantic information;

splice the relationship vector and the at least one sample dialog phrase to obtain at least one trigger word detection text corresponding to the at least one sample dialog phrase;

determine the trigger word detection text corresponding to each of the sample dialog phrases as the trigger word detection text data;

performing trigger word prediction based on the trigger word detection text data to obtain a predictive phrase label corresponding to each of the sample dialog phrases, the predictive phrase label representing a trigger word type of the sample dialog phrase; and determine the predictive phrase label corresponding to each of the sample dialog phrases as the one or more predicted sequence labels.

* * * * *